ized under 35 ged

(12) United States Patent
Nezaki et al.

(10) Patent No.: US 11,364,873 B2
(45) Date of Patent: Jun. 21, 2022

(54) CONTROL DEVICE FOR VEHICLE SEAT BELT

(71) Applicant: Toyota Jidosha Kabushiki Kaisha, Toyota Aichi-ken (JP)

(72) Inventors: Takuya Nezaki, Mizunami (JP); Koki Hayakawa, Yamanashi-ken (JP); Motoki Sugiyama, Kasugai (JP); Fumihito Komeno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 16/548,010

(22) Filed: Aug. 22, 2019

(65) Prior Publication Data
US 2020/0130642 A1    Apr. 30, 2020

(30) Foreign Application Priority Data

Oct. 29, 2018 (JP) .............................. JP2018-202670

(51) Int. Cl.
*B60R 22/48* (2006.01)
*B60R 21/0132* (2006.01)
(Continued)

(52) U.S. Cl.
CPC .......... *B60R 22/48* (2013.01); *B60R 21/0132* (2013.01); *B60R 22/46* (2013.01);
(Continued)

(58) Field of Classification Search
CPC ................ B60R 22/48; B60R 21/0132; B60R 2021/01327; B60R 22/46;
(Continued)

(56) References Cited

U.S. PATENT DOCUMENTS

| 2002/0175507 A1* | 11/2002 | Kobayashi | .......... B60R 21/0132 280/735 |
| 2003/0230004 A1* | 12/2003 | Lu | ...................... B60G 17/0185 701/45 |
| 2008/0221758 A1* | 9/2008 | Bernzen | .............. B60R 21/0132 701/45 |

FOREIGN PATENT DOCUMENTS

| DE | 4422820 A1 * | 1/1995 | ......... B60R 22/1953 |
| EP | 0800970 A1 * | 10/1997 | ............. B60R 22/44 |

(Continued)

OTHER PUBLICATIONS

Maekawa, Seat Belt Device, Sep. 6, 2018, EPO, JP 2018138411 A, Machine Translation of Description (Year: 2018).*

*Primary Examiner* — Paul N Dickson
*Assistant Examiner* — Matthew D Lee
(74) *Attorney, Agent, or Firm* — Dinsmore & Shohl LLP

(57) ABSTRACT

A control device for a vehicle seat belt, includes: a retraction unit that is configured to retract a seat belt through use of a driving force of a motor and to stop retracting the seat belt when the motor is stopped from being driven; an acceleration measurement unit that is configured to measure an acceleration of a vehicle; a state detection unit that is configured to detect whether or not the vehicle is in a stable state while running; and a control unit that is configured to stop driving the motor when the acceleration measured by the acceleration measurement unit during driving of the motor has remained lower than a first set acceleration for at least a first set time and the vehicle has remained in the stable state detected by the state detection unit for at least a second set time.

5 Claims, 17 Drawing Sheets

(51) Int. Cl.
*B60R 22/46* (2006.01)
*B60R 21/01* (2006.01)
*B60R 21/013* (2006.01)

(52) U.S. Cl.
CPC ............... *B60R 2021/01272* (2013.01); *B60R 2021/01304* (2013.01); *B60R 2022/4808* (2013.01)

(58) Field of Classification Search
CPC ........... B60R 2021/01272; B60R 2021/01286; B60R 2021/01304; B60R 2022/4808
See application file for complete search history.

(56) References Cited

FOREIGN PATENT DOCUMENTS

| | | | | |
|---|---|---|---|---|
| EP | 1480382 | A2 * | 12/2004 | ......... B60R 21/0132 |
| EP | 2277748 | A1 | 1/2011 | |
| JP | 2006298187 | A | 11/2006 | |
| JP | 2010038194 | A | 2/2010 | |
| JP | 2011016450 | A | 1/2011 | |
| JP | 2018138411 | A * | 9/2018 | ......... B60R 22/1953 |
| WO | WO-9947383 | A1 * | 9/1999 | ........... B60R 21/013 |

* cited by examiner

CONTROL DEVICE FOR VEHICLE SEAT BELT

CROSS-REFERENCE TO RELATED APPLICATION

This application claims priority to Japanese Patent Application No. 2018-202670 filed on Oct. 29, 2018 the disclosure of which is incorporated herein by reference in its entirety.

BACKGROUND

1. Technical Field

The disclosure relates to a control device for a vehicle seat belt.

2. Description of Related Art

In a seat belt device of Japanese Patent Application Publication No. 2006-2981.87 (JP 2006-298187 A), when it is determined that there is no unstable behavior of a vehicle, a restraint state of an occupant is returned to its initial state.

SUMMARY

There is a vehicle having a control device that is designed for a vehicle seat belt and that performs an operation of retracting the seat belt based on a detection result of a state of the vehicle. This vehicle may assume a so-called slalom state during running. That is, the steering angle of the vehicle may change from a large angle to 0° and then become large again. It should be noted herein that according to a configuration in which only the unstable behavior of the vehicle is used as a trigger as is the case with the device of JP 2006-298187 A, the control device may determine that the behavior of the vehicle is stable and relax the restraint of the occupant when the steering angle of the vehicle is close to 0°, although the vehicle has not got out of the slalom state. Then, the occupant may develop a feeling of strangeness because the restraint of the occupant by the seat belt has been relaxed despite the fact that the vehicle is in the slalom state.

That is, in the control device that is designed for the vehicle seat belt and that performs the operation of retracting the seat belt based on the detection result of the state of the vehicle, there is room for improvement in restraining the occupant from developing a feeling of strangeness.

The disclosure provides a control device that is designed for a vehicle seat belt, that performs an operation of retracting the seat belt based on a detection result of a vehicle state, and that can restrain an occupant from developing a feeling of strangeness.

An aspect of the disclosure provides a control device for a vehicle seat belt, including: a retraction unit that is configured to retract a seat belt through use of a driving force of a motor and to stop retracting the seat belt when the motor is stopped from being driven; an acceleration measurement unit that is configured to measure an acceleration of a vehicle; a state detection unit that is configured to detect whether or not the vehicle is in a stable state while running; and a control unit that is configured to stop driving the motor when the acceleration measured by the acceleration measurement unit during driving of the motor has remained lower than a first set acceleration for at least a first set time and the vehicle has remained in the stable state detected by the state detection unit for at least a second set time, and to continue to drive the motor at least either when the acceleration has remained lower than the first set acceleration for a time shorter than the first set time, or when the vehicle has remained in the stable state detected by the state detection unit for a time shorter than the second set time.

In the control device for a vehicle seat belt according to the above-mentioned aspect, the control unit stops driving the motor when the acceleration measured by the acceleration measurement unit during the driving of the motor has remained lower than the set acceleration for at least the first set time and the vehicle has remained in the stable state detected by the state detection unit for at least the second set time. Therefore, the motor is stopped from being driven with less necessity to restrain the occupant than in a configuration in which a determination on the stoppage of the driving of the motor is made based only on one of a duration time of the acceleration of the vehicle and a duration time of the stable state of the vehicle. Therefore, the occupant can be restrained from developing a feeling of strangeness.

On the other hand, the control unit continues to drive the motor at least either when the acceleration has remained lower than the set acceleration for a time shorter than the first set time or when the vehicle has remained in the stable state detected by the state detection unit for a time shorter than the second set time. Thus, the motor is restrained from being stopped from being driven when the occupant needs to be restrained. Therefore, the occupant can be restrained from developing a feeling of strangeness.

In the above aspect, the control device may further include: a vehicle speed sensor that is configured to measure a speed of the vehicle; and a steering angle sensor that is configured to measure a steering angle of the vehicle. The state detection unit may be configured to detect a running state of the vehicle as the stable state when an estimated acceleration obtained based on the speed and the steering angle is equal to or lower than a second set acceleration, and to detect the running state of the vehicle as an unstable state when the estimated acceleration is higher than the second set acceleration.

In the aforementioned configuration, when a determination on the stoppage of the driving of the motor is made, the speed of the vehicle and the steering angle of the vehicle as well as the acceleration of the vehicle are used as the conditions for making the determination. That is, it is determined, through the use of more pieces of information on the vehicle, whether or not the vehicle is in the stable state. Therefore, the occupant can be more restrained from developing a feeling of strangeness than in a configuration in which the conditions for making the determination do not include the speed of the vehicle and the steering angle of the vehicle.

In the above aspect, the vehicle may be further provided with a side skid suppression unit configured to suppress a side skid of the vehicle and to output an actuation signal to the state detection unit in suppressing the side skid, and the state detection unit may be configured to detect a running state of the vehicle as the stable state when the actuation signal is not input to the state detection unit, and to detect the running state of the vehicle as an unstable state when the actuation signal is input to the state detection unit.

In the aforementioned configuration, when a determination on the stoppage of the driving of the motor is made, the presence/absence of the operation of suppressing the side skid of the vehicle as well as the acceleration of the vehicle is used as a condition for making the determination. That is, it is determined, through the use of more pieces of information on the vehicle, whether or not the vehicle is in the stable state. Therefore, the occupant can be more restrained from developing a feeling of strangeness than in a configuration in which the conditions for making the determination do not include the presence/absence of the side skid of the vehicle.

In the above aspect, the control device may further include: a friction coefficient estimation unit that is configured to estimate a friction coefficient of a road surface on which the vehicle runs, and the control unit may be configured to reduce the first set acceleration when the friction coefficient estimated by the friction coefficient estimation unit is lower than a set friction coefficient.

In the case where the friction coefficient of the road surface is relatively low, the vehicle may skid at the same speed and in the same direction before the vehicle stops or assumes the stable state. Then, when the vehicle skids at the same speed and in the same direction, it may be determined that the vehicle is in the stable state.

It should be noted herein that the friction coefficient estimation unit estimates the friction coefficient of the road surface in the above-mentioned configuration. Then, the control unit reduces the set acceleration when the friction coefficient estimated by the friction coefficient estimation unit is lower than the set friction coefficient. Therefore, the motor is not stopped from being driven unless the vehicle assumes the stable state with a lower acceleration than before the set acceleration is reduced. Therefore, the restraint of the occupant can be restrained from being relaxed in a state where the vehicle is likely to skid sideways.

In the above configuration, the control unit may be configured to lengthen at least one of the first set time and the second set time when the friction coefficient estimated by the friction coefficient estimation unit is lower than the set friction coefficient.

In the above-mentioned configuration, the friction coefficient estimation unit estimates the friction coefficient of the road surface. Then, the control unit not only reduces the set acceleration but also lengthens at least one of the first set time and the second set time when the friction coefficient estimated by the friction coefficient estimation unit is lower than the set friction coefficient. Therefore, the motor is not stopped from being driven unless the vehicle assumes a more stable state than before at least one of the first set time and the second set time is lengthened. Thus, the restraint of the occupant can be further restrained from being relaxed in a state where the vehicle is likely to skid sideways.

In the above aspect, the control device may further include: a friction coefficient estimation unit that is configured to estimate a friction coefficient of a road surface on which the vehicle runs, and the control unit may be configured to lengthen at least one of the first set time and the second set time when the friction coefficient estimated by the friction coefficient estimation unit is lower than a set friction coefficient.

In the above-mentioned configuration, the friction coefficient estimation unit estimates the friction coefficient of the road surface. Then, the control unit lengthens at least one of the first set time and the second set time when the friction coefficient estimated by the friction coefficient estimation unit is lower than the set friction coefficient. Therefore, the motor is not stopped from being driven unless the acceleration of the vehicle becomes lower and the vehicle assumes a more stable state than before at least one of the first set time and the second set time is lengthened. Thus, the restraint of the occupant can be restrained from being relaxed in a state where the vehicle is likely to skid sideways.

As described above, the aspect of the disclosure makes it possible to obtain a control device that is designed for a vehicle seat belt, that performs an operation of retracting the seat belt based on a detection result of h vehicle state, and that can restrain an occupant from developing a feeling of strangeness.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION

First Embodiment

Figure 1:
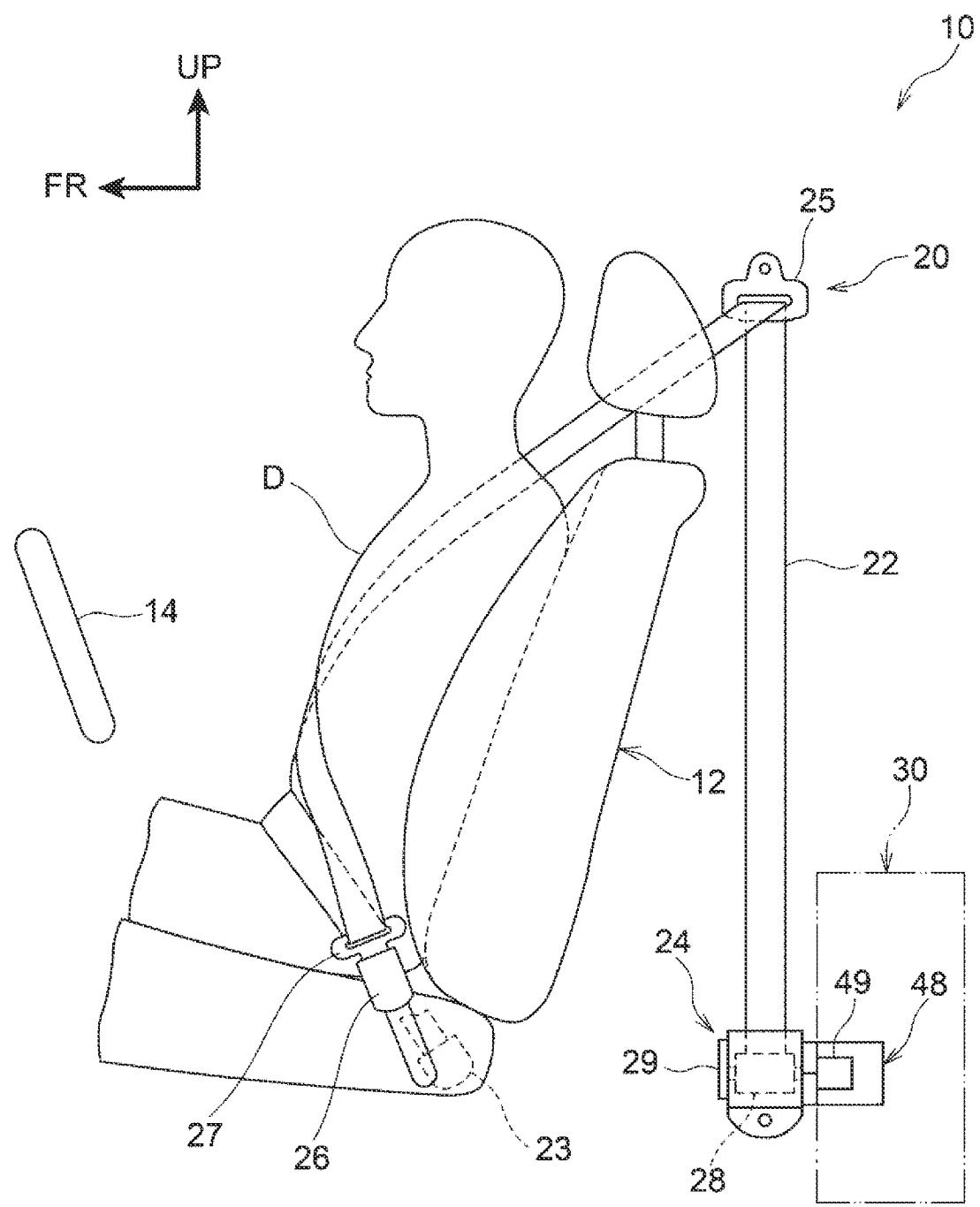
FIG. 1 is a lateral view showing a state where an occupant sitting in a seat is restrained by a seat belt in a vehicle that is provided with a seat belt control device according to a first embodiment.

A seat belt control device 30 as an exemplary control device for a vehicle seat belt according to a first embodiment, and a vehicle 10 that is provided with the seat belt control device 30 will be described though the use of FIGS. 1 to 4. Incidentally, for the sake of convenience of explanation, arrows UP and FR shown in the drawings represent an upward direction with respect to the vehicle 10 and a vehicle seat 12, and a forward direction with respect to the vehicle 10 and the vehicle seat 12, respectively. Besides, in the following description, vertical, longitudinal, and lateral directions represent vertical, longitudinal, and lateral directions with respect to the vehicle 10 and the vehicle seat 12 respectively (when orientated in a traveling direction), unless otherwise specified.

[General Configuration]

The vehicle 10 shown in FIG. 1 is configured to include the vehicle seat 12, which is provided on a vehicle body (not shown), a steering wheel 14, a seat belt device 20, and the seat belt control device 30.

The vehicle seat 12 is, for example, a front seat as a driver seat. An occupant D (a driver) sits in the vehicle seat 12. The steering wheel 14 is a steering unit that is steered by the occupant D. Incidentally, an ECU 32 (see FIG. 2) that will be described later can control a steering torque of the steering wheel 14.

The seat belt device 20 is provided in such a manner as to correspond to the vehicle seat 12. Besides, the seat belt device 20 is configured to include a webbing 22, an anchor plate 23, a reeling unit 24, a shoulder anchor 25, a buckle 26, and a tongue plate 27. The reeling unit 24 has a spool 28 that, reels off the webbing 22, and an urging unit 29 that urges the spool 28, through the use of a spring (not shown), in a direction in which the webbing 22 is reeled off.

The webbing 22 is an example of the seat belt. The webbing 22 is attached at one end portion thereof to a lateral portion of the vehicle seat 12 via the anchor plate 23. The webbing 22 is engaged at the other end portion thereof with the spool 28. An intermediate portion of the webbing 22 is inserted through the shoulder anchor 25 and folded back. The buckle 26 is provided on a lateral portion of the vehicle seat 12 on the opposite side from the anchor plate 23. The tongue plate 27 is slidably provided on the webbing 22. Besides, the tongue plate 27 can be engaged with the buckle 26.

In the seat belt device 20, when the tongue plate 27 is engaged with the buckle 26 with the occupant D sifting in the vehicle seat 12, the webbing 22 is thereby worn by the occupant D. In other words, the occupant D is restrained by the seat belt device 20.

[Configuration of Essential Part]

Next, the seat belt control device 30 will be described.

Figure 2:
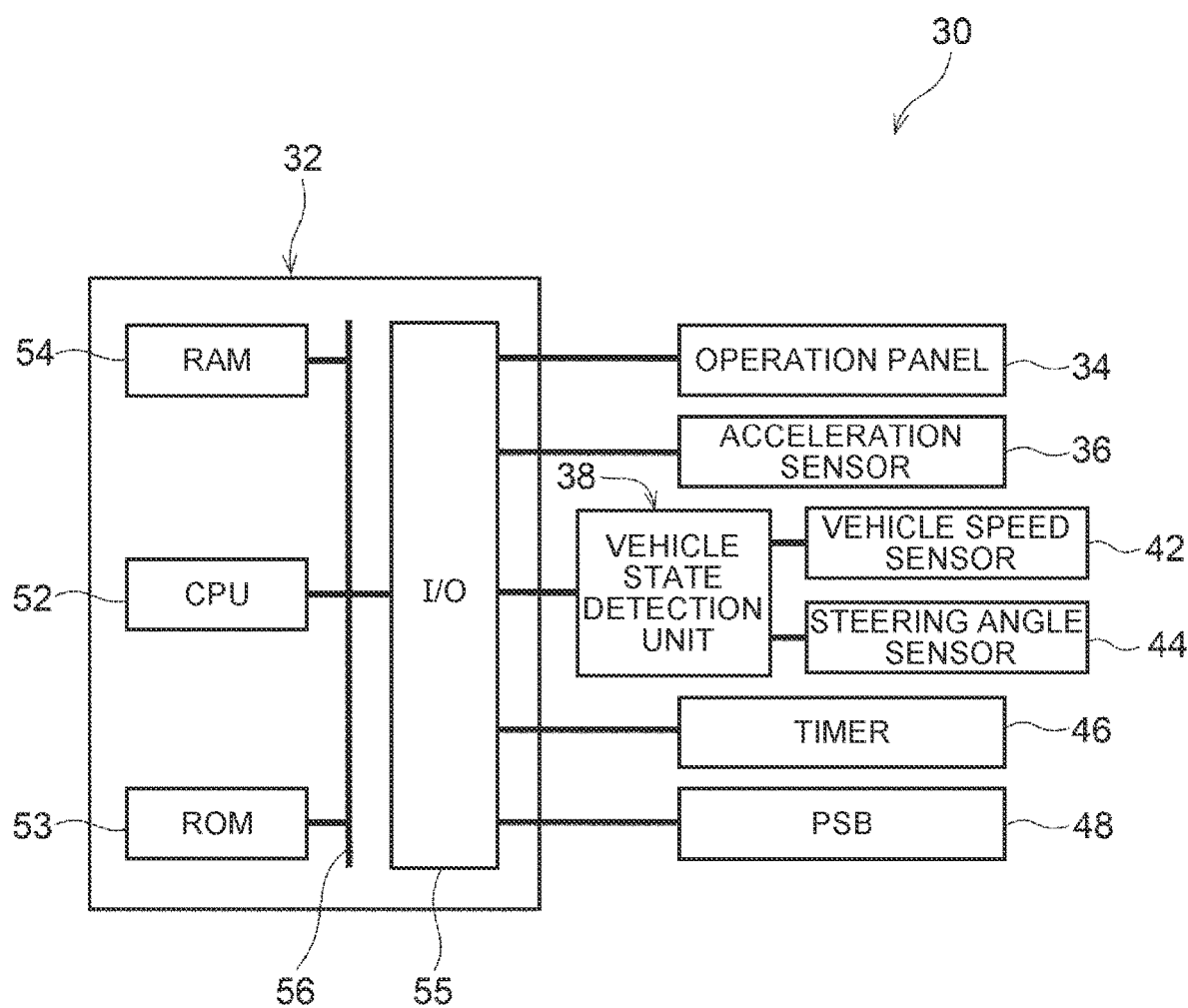
FIG. 2 is a block diagram showing the configuration of the seat belt control device shown in FIG. 1.

As shown in FIG. 2, the seat belt control device 30 has, for example, the ECU 32, an operation panel 34, an acceleration sensor 36, a vehicle state detection unit 38, a vehicle speed sensor 42, a steering angle sensor 44, a timer 46, and a PSB 48. An electronic control unit is abbreviated as the ECU 32. A pre-crash seat belt mechanism unit is abbreviated as the PSB 48. Incidentally, the term "PSB" will be consistently used in the present disclosure, but the PSB 48 may also be referred to as a motorized seat belt mechanism unit (an MSB).

(ECU)

The ECU 32 is an example of the control unit. Besides, the ECU 32 has a central processing unit (a CPU) 52, a read only memory (a ROM) 53, a random access memory (a RAM) 54; and an input/output interface (an I/O) 55. Moreover, the ECU 32 is configured as a computer having a bus 56 to which these components are connected. Various elements of the vehicle 10 (see FIG. 1) including the operation panel 34, the acceleration sensor 36, the vehicle state detection unit 38, the timer 46, and the PSB 48 are electrically connected to the ECU 32. Incidentally, various settings in the ECU 32 and actuation control of the PSB 48 by the ECU 32 will be described later.

(Operation Panel)

The operation panel 34 is provided on, for example, an instrument panel (not shown) of the vehicle 10 (see FIG. 1). Besides, the operation panel 34 is configured as a touch panel (not shown). Operation buttons for starting and stopping the operations of the various elements of the vehicle 10, and setting buttons for carrying out various settings in the seat belt control device 30 are displayed on the operation panel 34. Operation information (setting information) on the operations performed on the operation panel 34 is output to the ECU 32.

(Acceleration Sensor)

The acceleration sensor 36 is an example of the acceleration measurement unit. Besides, the acceleration sensor 36 is configured to measure an acceleration Aa applied to the vehicle 10 (see FIG. 1) (an acceleration of the vehicle in at least one of a vehicle longitudinal direction and a vehicle width direction). Information on the acceleration Aa (a vehicle G) measured by the acceleration sensor 36 is output to the ECU 32.

(Vehicle State Detection Unit)

The vehicle state detection unit 38 is an example of the state detection unit. Besides, the vehicle state detection unit 38 is configured as a computer having a bus (not shown) to which a CPU (not shown), a ROM (not shown), a RAM (not shown), and an I/O (not shown) are connected. For example, the vehicle speed sensor 42 and the steering angle sensor 44 are electrically connected to the vehicle state detection unit 38.

(Vehicle Speed Sensor)

The vehicle speed sensor 42 is provided in a region whose rotational speed changes in such a manner as to correspond to a speed of the vehicle 10 (hereinafter referred to as a vehicle speed) or the like, for example, a brake rotor (not shown) or a transmission (not shown) of the vehicle 10 (see FIG. 1). Moreover, the vehicle speed sensor 42 measures the vehicle speed of the vehicle 10 based on a change in the rotational speed. Information on the vehicle speed measured by the vehicle speed sensor 42 is output to the ECU 32.

(Steering Angle Sensor)

The steering angle sensor 44 measures a steering angle (an angle of steering) of the steering wheel 14 (see FIG. 1). The steering angle is defined to be zero in a state where the steering wheel 14 is at a reference position (in a neutral state). Besides, the steering angle sensor 44 determines whether the steering wheel 14 has been steered rightward or leftward, depending on whether the sign of the steering angle is positive or negative. According to a method of detecting the steering angle (the angle of steering), an S-pole magnetic body and an N-pole magnetic body are arranged on a steering wheel shaft (not shown) side, and the steering angle is detected by detecting a change in magnetism through the use of a ring-like member surrounding the steering wheel shaft.

It should be noted herein that the vehicle state detection unit 38 detects whether or not the vehicle 10 is in a stable state while running (the behavior of the vehicle). In concrete terms, the vehicle state detection unit 38 is configured to obtain an estimated acceleration Ac (m/s$^2$), based on a vehicle speed V (m/s) measured by the vehicle speed sensor 42 and a steering angle θ (rad) measured by the steering angle sensor 44. In the present embodiment, the vehicle state detection unit 38 obtains the estimated acceleration Ac (an estimated G) through the use of an arithmetic expression (Ac=V$^2$×8×K) where K denotes a coefficient obtained in advance through an experiment or the like. Incidentally, the vehicle speed V, the steering angle θ, the coefficient K, and the estimated acceleration Ac are not mentioned in the drawings.

Then, when the estimated acceleration Ac thus obtained is equal to or lower than a set acceleration Ak for estimation that has been set in advance in the vehicle state detection unit 38, the vehicle state detection unit 38 detects (determines) that the behavior of the vehicle is in the stable state, and outputs detected information on the stable state to the ECU 32. Besides, when the estimated acceleration Ac thus obtained is higher than the set acceleration Ak for estimation, the vehicle state detection unit 38 detects (determines) that the behavior of the vehicle is in an unstable state, and outputs detected information on the unstable state to the ECU 32.

⟨Timer⟩

The timer 46 measures various types of elapsed time in the vehicle 10 (see FIG. 1). The ECU 32 issues a command to actuate or stop actuating the timer 46. Besides, time information measured by the timer 46 is output to the ECU 32.

⟨PSB⟩

The PSB 48 shown in FIG. 1 is an example of the retraction unit, and is equipped with a motor 49 that is arranged beside the spool 28. By rotating the motor 49, the spool 28 is driven in the direction in which the webbing 22 is reeled off. Besides, upon being actuated, the PSB 48 applies a tensile force to the webbing 22 (retracts the webbing 22) by rotating the spool 28 in the direction in which the webbing 22 is reeled off. That is, the PSB 48 retracts the webbing 22 through the use of a driving force of the motor 49. Besides, when the motor 49 is stopped from being driven, the PSB 48 cancels retraction of the webbing 22. Driving control of the motor 49 is performed by the ECU 32 (see FIG. 2).

⟨Settings in ECU⟩

A program is set in the ECU 32 in such a manner as to stop driving the motor 49 when a first state and a second state, which will be described later, are established during the driving of the motor 49. In the first state, the vehicle G measured by the acceleration sensor 36 has remained lower than a set acceleration A1 (a set G) for at least a first set time TA. In the second state, the vehicle 10 has remained in the stable state detected by the vehicle state detection unit 38 for at least a second set time TB.

Furthermore, a program is set in the ECU 32 in such a manner as to continue to drive the motor 49 when at least one of a third state and a fourth state, which will be described later, is established during the driving of the motor 49. In the third state, the acceleration measured by the acceleration sensor 36 has remained lower than the set acceleration A1 for a time shorter than the first set time TA. In the fourth state, the vehicle 10 has remained in the stable state detected by the vehicle state detection unit 38 for a time shorter than the second set time TB.

Figure 3:
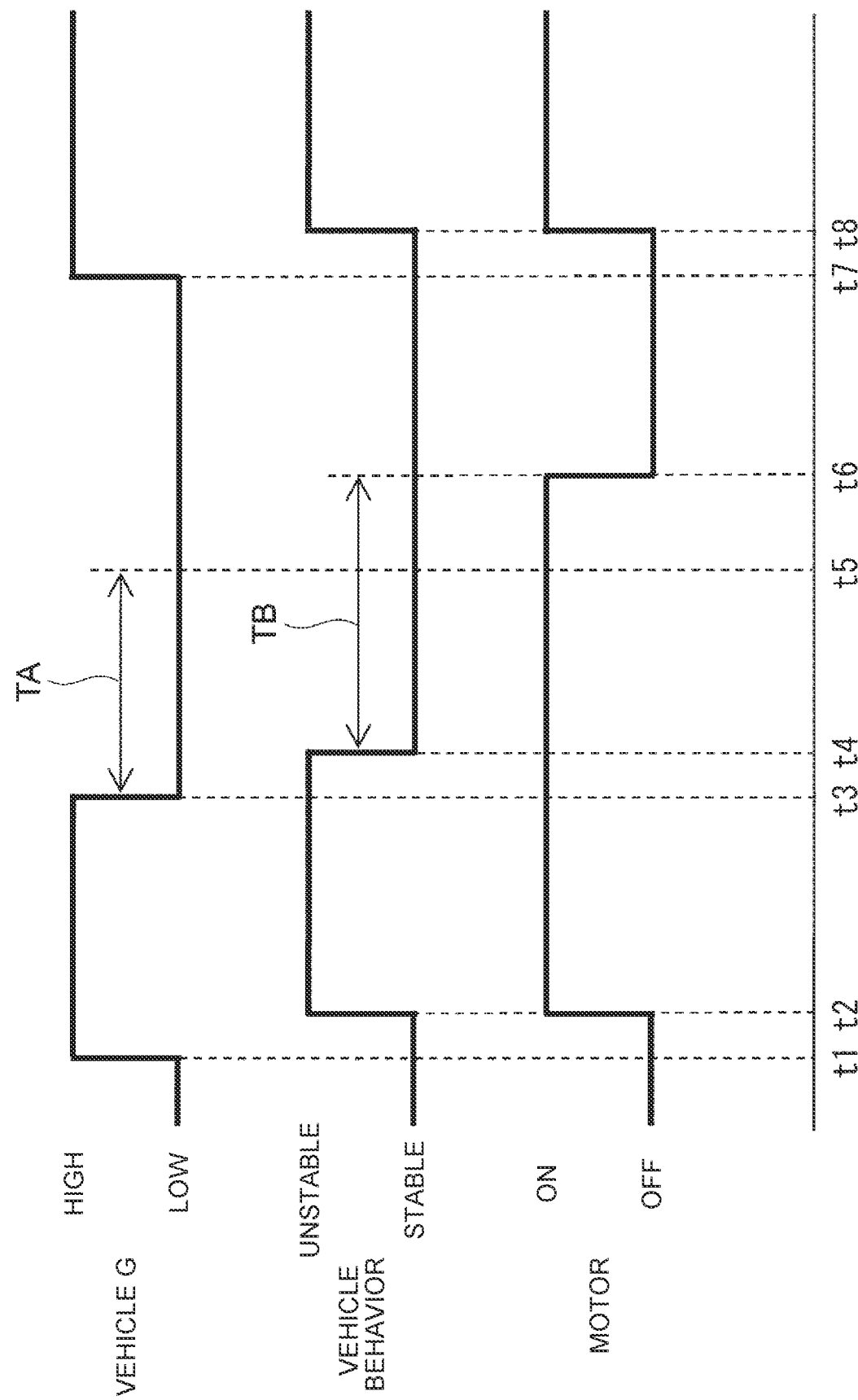
FIG. 3 is a timing chart showing a vehicle behavior signal, a vehicle G signal, and a motor driving signal during the running of the vehicle shown in FIG. 1.

FIG. 3 shows, in the form of a timing chart, a signal representing the vehicle G measured by the acceleration sensor 36 (see FIG. 2), a signal representing the behavior of the vehicle detected by the vehicle state detection unit 38 (see FIG. 2), and a signal representing the driving of the motor 49 (see FIG. 1), as examples. Incidentally, among timings t1, t2, t3, t4, t5, t6, t7, and t8 shown in FIG. 3, there is a relationship: t1<t2<t3<t4<t5<t6<t7<t8.

As for the signal representing the vehicle G, the vehicle G is high from the timing t1 to the timing t3 and at and after the timing t7. On the other hand, the vehicle G is low until the timing t1 and from the timing t3 to the timing t7. As for the signal representing the behavior of the vehicle, the vehicle 10 is in the unstable state from the timing t2 to the timing t4 and at and after the timing t8. On the other hand, the vehicle 10 is in the stable state until the timing t2 and from the timing t4 to the timing t8. As for the signal representing the driving of the motor 49, the motor 49 is on (in a driven state) from the timing C to the timing t6 and at and after the timing t8. On the other hand, the motor 49 is off (in a stopped state) until the timing t2 and from the timing t6 to the timing t8.

The first set time TA is presented as, for example, a time equivalent to a length from the timing t3 to the timing t5. The second set time TB is presented as, for example, a time equivalent to a length from the timing t4 to the timing t6.

[State of Vehicle and Various Signals]

Figure 4:
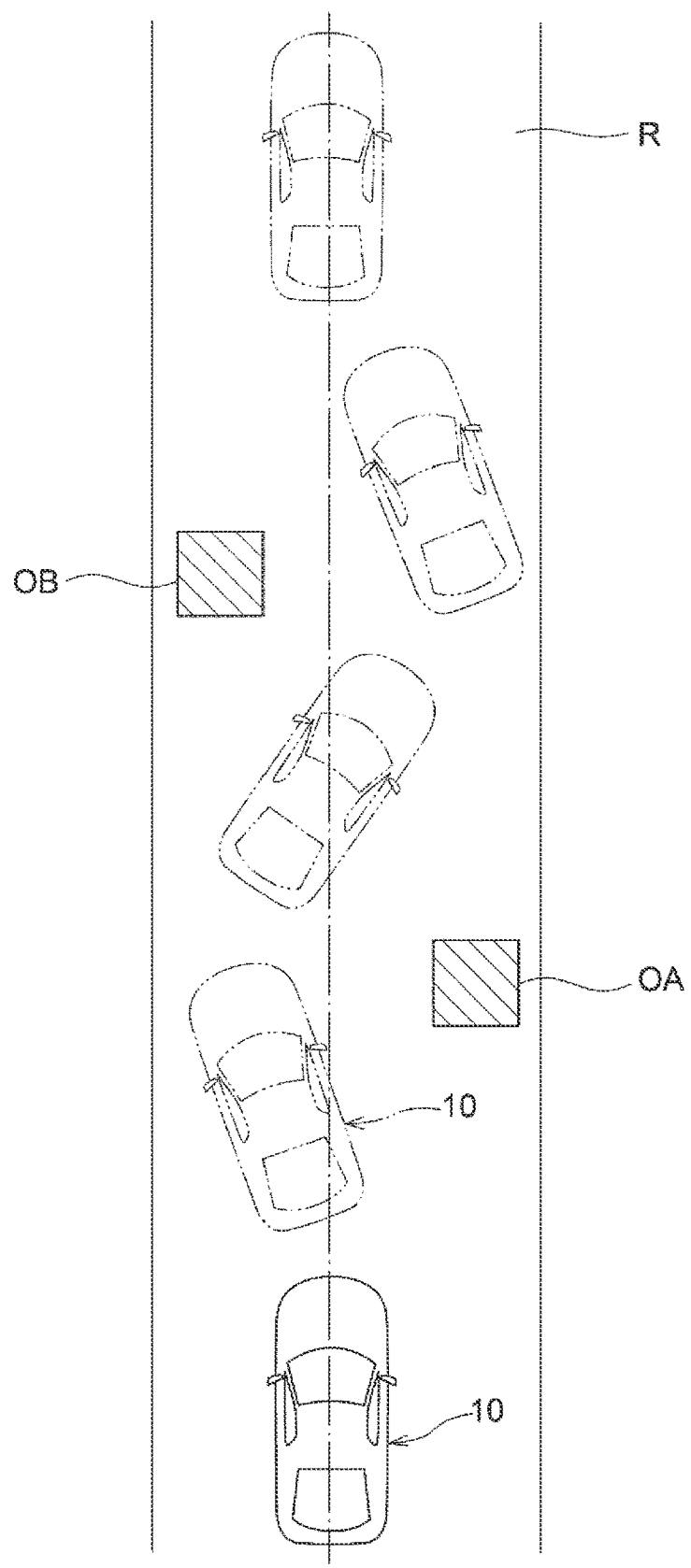
FIG. 4 is a plan view showing a slalom state during the running of the vehicle shown in FIG. 1.

FIG. 4 shows, for example, a state where there are obstacles OA and OB on a road surface R on which the vehicle 10 runs and the vehicle 10 runs in a slalom (meandering) state. When this state is viewed in terms of the steering angle of the vehicle 10, the steering angle changes from zero to a large leftward steering angle and becomes again equal to zero, and then, changes to a large rightward steering angle and becomes again equal to zero. The seat belt control device 30 (see FIG. 2) according to the present embodiment restrains the occupant D (see FIG. 1) of the vehicle 10 from developing a feeling of strangeness when the steering angle is equal to or close to zero during this slalom.

Figure 5:
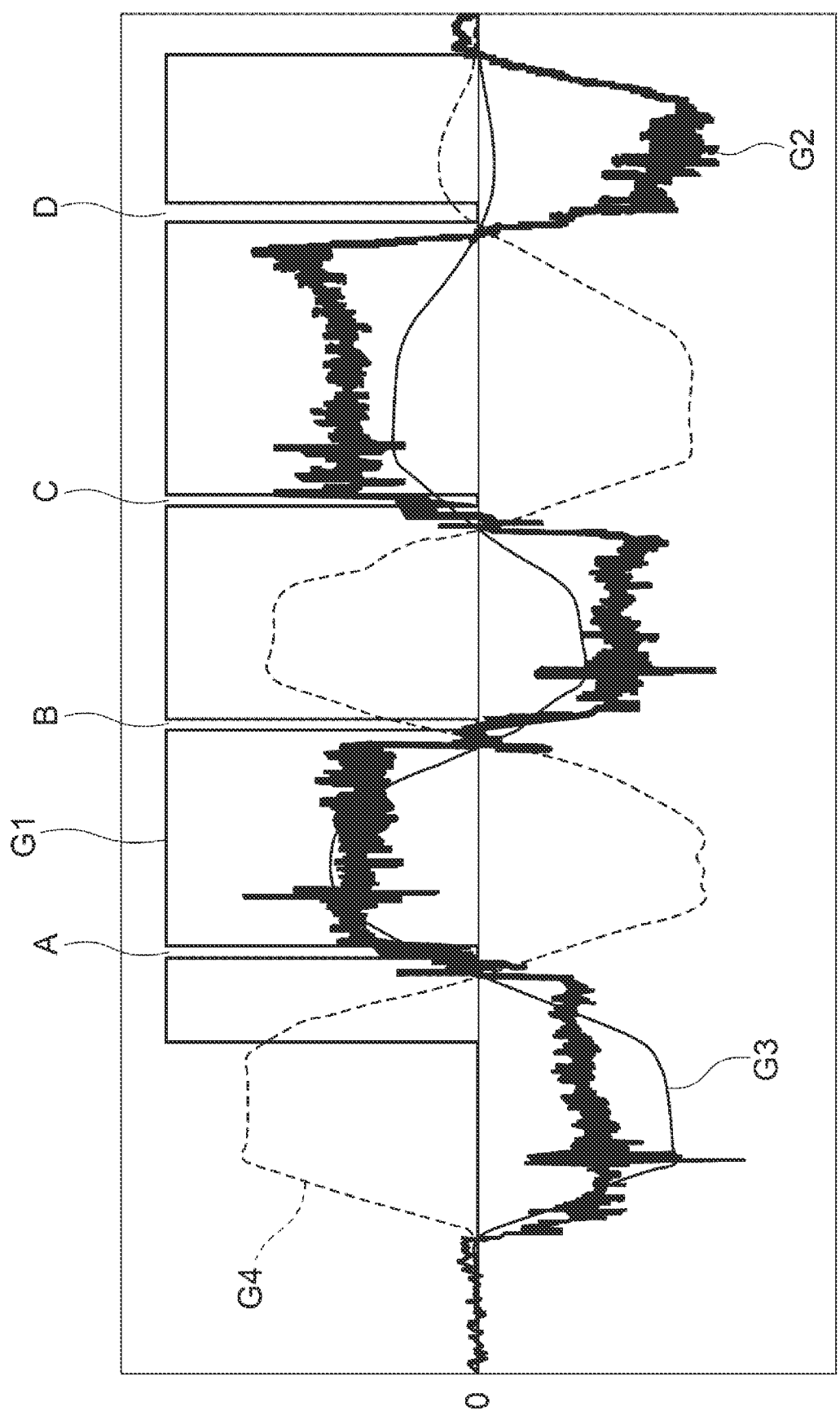
FIG. 5 is a graph showing a steering angle signal, the vehicle G signal, an estimated G signal, and the vehicle behavior signal in the slalom state during the running of the vehicle shown in FIG. 1.

FIG. 5 shows the signal representing the behavior of the vehicle (a graph G1), the signal representing the vehicle G (a graph G2), a signal representing the estimated G (a graph G3), and a signal representing the steering angle (a graph G4), as examples. A look at the signal representing the behavior of the vehicle makes it clear herein that there are, for example, four lengths of time (sections A, B, C, and D) during which the behavior of the vehicle is in the stable state when the steering angle is equal to or close to zero. The seat belt control device 30 (see FIG. 2) according to the embodiment restrains the occupant D of the vehicle 10 from developing a feeling of strangeness in these sections A, B, C, and D.

[Operation and Effect]

Figure 6:
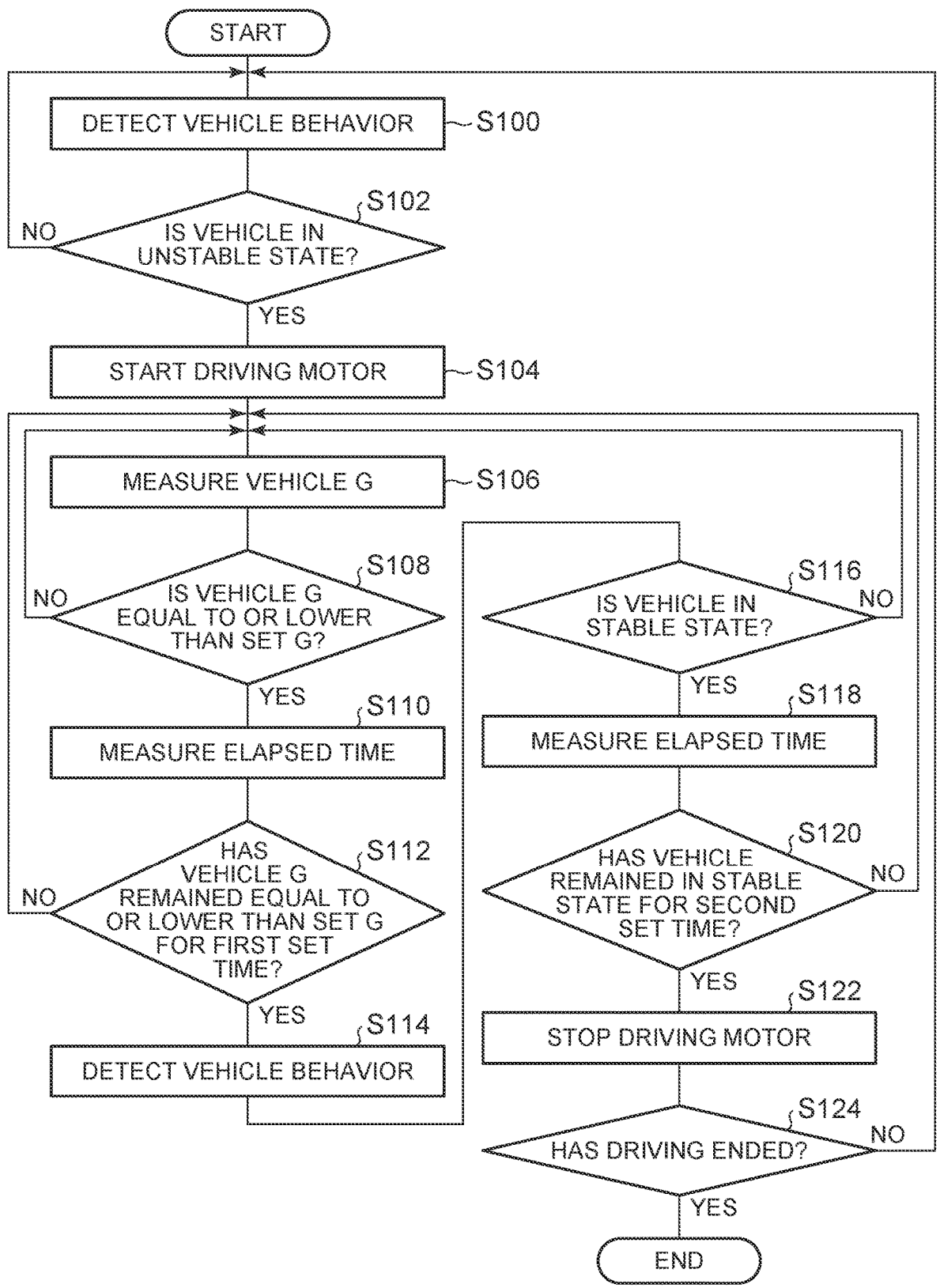
FIG. 6 is a flowchart showing a process of selecting the stoppage or continuation of the driving of a motor of a pre-crash seat belt mechanism unit (hereinafter referred to as "a PSB") in the seat belt control device shown in FIGS. 1 and 2.

Next, the operation and effect of the seat belt control device 30 according to the first embodiment will be described using a flowchart shown in FIG. 6. Incidentally, reference should be made to FIGS. 1 to 3 in terms of the various components and the like of the vehicle 10 including the seat belt control device 30, and individual reference numerals thereof are omitted.

In step S100, as an example of detection of the behavior of the vehicle, the vehicle state detection unit 38 detects the behavior of the vehicle. In concrete terms, the vehicle state detection unit 38 compares the estimated acceleration Ac obtained and the set acceleration Ak for estimation with each other. When the estimated acceleration Ac is equal to or lower than the set acceleration Ak for estimation, the vehicle state detection unit 38 outputs a signal corresponding to the stable state to the ECU 32. Besides, when the estimated acceleration Ac is higher than the set acceleration Ak for estimation, the vehicle state detection unit 38 outputs a signal corresponding to the unstable state to the ECU 32. Then, a transition to step S102 is made.

In step S102, the ECU 32 determines, based on information on the behavior of the vehicle input from the vehicle state detection unit 38, whether or not the vehicle is in the unstable state. If the vehicle 10 is in the unstable state, a transition to step S104 is made. If the vehicle 10 is in the stable state, a transition to step S100 is made.

In step S104, the ECU 32 starts driving the motor 49 (turns the motor 49 on). Then, a transition to step S106 is made.

In step S106, the acceleration sensor 36 measures the vehicle G. Information on the measured vehicle G is output to the ECU 32. Then, a transition to step S108 is made.

In step S108, the ECU 32 determines whether or not the vehicle G input from the acceleration sensor 36 is equal to or lower than the set G. If the vehicle G is equal to or lower than the set G, a transition to step S110 is made. If the vehicle G is higher than the set G, a transition to step S106 is made.

In step S110, the timer 46 measures an elapsed time T1 (not shown). Information on the measured elapsed time T1 is output to the ECU 32. In concrete terms, the information on the elapsed time T1 from a timing when the vehicle G becomes lower than the set G to a timing of measurement is output to the ECU 32. Then, a transition to step S112 is made.

In step S112, the ECU 32 determines whether or not the elapsed time T1 is equal to or longer than the first set time TA. If the elapsed time T1 is equal or longer than the first set time TA, a transition to step S114 is made. If the elapsed time T1 is shorter than the first set time TA, a transition to step S106 is made.

In step S114, the vehicle state detection unit 38 detects the behavior of the vehicle according to a method similar to that of step S100. Besides, the vehicle state detection unit 38 outputs a signal corresponding to the stable state or the unstable state to the ECU 32. Then, a transition to step S116 is made.

In step S116, the ECU 32 determines, based on information on the behavior of the vehicle input from the vehicle state detection unit 38, whether or not the vehicle is in the stable state. If the vehicle 10 is in the stable state, a transition to step S118 is made. If the vehicle 10 is in the unstable state, a transition to step S106 is made.

In step S118, the timer 46 measures an elapsed time T2 (not shown). Information on the measured elapsed time T2 is output to the ECU 32. In concrete terms, the information on the elapsed time T2 from the timing t4 when the estimated acceleration Ac becomes lower than the set acceleration Ak for estimation to a timing of measurement is output to the ECU 32. Then, a transition to step S120 is made.

In step S120, the ECU 32 determines whether or not the elapsed time T2 is equal to or longer than the second set time TB. If the elapsed time T2 is equal to or longer than the second set time TB, a transition to step S122 is made. If the elapsed time T2 is shorter than the second set time TB, a transition to step S106 is made.

In step S122, the ECU 32 stops driving the motor 49 (turns the motor 49 off). Thus, the PSB 48 is deactivated (the urging unit 29 urges the spool 28), and the restraint state of the occupant D is relaxed. Then, a transition to step S124 is made.

In step S124, the ECU 32 determines, based on operating states of an accelerator (not shown), a brake (not shown) and the like of the vehicle 10; whether or not the vehicle is stopped from being driven. If the vehicle continues to be driven, a transition to step S100 is made. If the vehicle is stopped from being driven, the program is ended (the present processing routine is ended).

As described above, in the seat belt control device 30, the ECU 32 stops driving the motor 49 when the acceleration measured by the acceleration sensor 36 during the driving of the motor 49 has remained lower than the set acceleration A1 for at least the first set time TA and the vehicle 10 has remained in the stable state detected by the vehicle state detection unit 38 for at least the second set time TB. Therefore, the motor 49 is stopped from being driven with less necessity to restrain the occupant D than in a configuration in which a determination on the stoppage of the driving of the motor 49 is made based only on one of a duration time of the acceleration of the vehicle 10 and a duration time of the stable state of the vehicle 10. Therefore, the occupant D can be restrained from developing a feeling of strangeness. Besides, the motor 49 is stopped from being driven, and the urging unit 29 urges the spool 28. Therefore, the occurrence of a so-called end lock state where the pullout of the webbing 22 is locked can be suppressed.

On the other hand, the ECU 32 continues to drive the motor 49 at least either when the acceleration has remained lower than the set acceleration A1 for a time shorter than the first set time TA or when the vehicle has remained in the stable state detected by the vehicle state detection unit 38 for a time shorter than the second set time TB. Thus, the motor 49 is restrained from being stopped from being driven when the occupant D needs to be restrained. Therefore, the occupant D can be restrained from developing a feeling of strangeness. For example, when the vehicle 10 is in a slalom state and the steering angle is equal to or close to zero, the motor 49 is not stopped from being driven, and the restraint of the occupant D is not relaxed. Therefore, the occupant D can be restrained from developing a feeling of strangeness.

Besides, in the seat belt control device 30, when a determination on the stoppage of the driving of the motor 49 is made, the speed V of the vehicle 10 and the steering angle θ of the vehicle 10 as well as the acceleration of the vehicle 10 are used as conditions for making the determination. That is, it is determined, through the use of more pieces of information on the vehicle 10, whether or not the vehicle 10 is in the stable state. Therefore, the occupant D can be more restrained from developing a feeling of strangeness than in a configuration in which the conditions for making the determination do not include the speed V of the vehicle 10 and the steering angle θ of the vehicle 10.

Second Embodiment

Next, a seat belt control device 60 as an exemplary control device for a vehicle seat belt according to a second embodiment will be described. The seat belt control device 60 is provided instead of the seat belt control device 30 (see FIG. 1) in the vehicle 10 (see FIG. 1). Incidentally, the basically same components as those of the seat belt control device 30 are denoted by the same reference symbols respectively, and the description thereof will be omitted. Besides, the components of the vehicle 10 other than the seat belt control device 60 are identical to those of the first embodiment, so the description thereof will be omitted.

Figure 7:
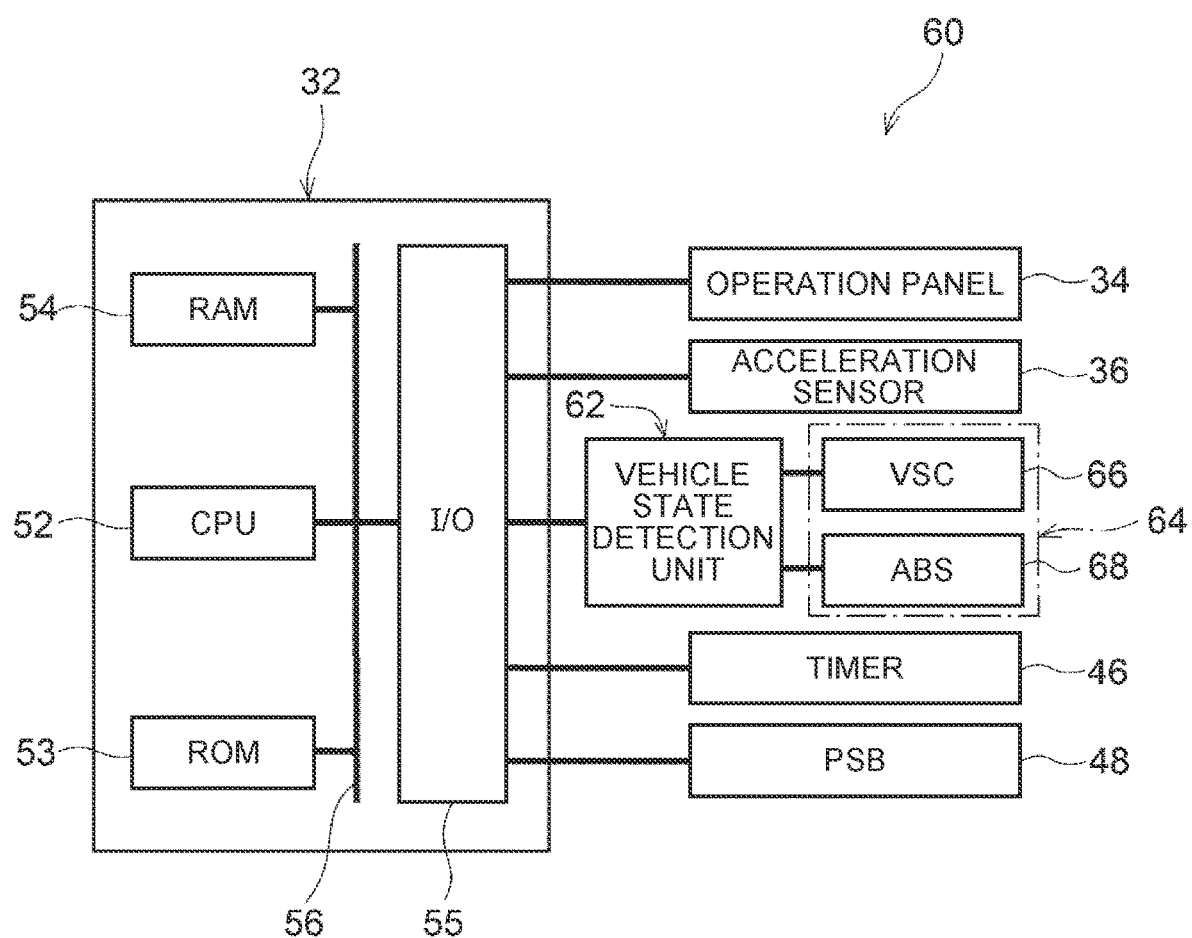
FIG. 7 is a block diagram showing the configuration of a seat belt control device according to a second embodiment.

The seat belt control device 60 shown in FIG. 7 is obtained by providing the seat belt control device 30 (see FIG. 2) with a vehicle state detection unit 62 and a side skid suppression unit 64 instead of the vehicle state detection unit 38, the vehicle speed sensor 42, and the steering angle sensor 44 (see FIG. 2). The components other than the vehicle state detection unit 62 and the side skid suppression unit 64 are identical to those of the seat belt control device 30.

⟨ Side Skid Suppression Unit⟩

The side skid suppression unit 64 has, for example, a VSC 66 and an ABS 68. Vehicle stability control is abbreviated as the VSC 66. An anti-locked braking system is abbreviated as the ABS 68. The VSC 66 and the ABS 68 will be described hereinafter concretely.

(VSC)

The VSC 66 measures the vehicle speed V of the vehicle 10 (see FIG. 1), rotational speeds and torques of respective tires (not shown), and the like. The VSC 66 is configured to cause the vehicle 10 to run stably by then making a determination on a degree of skid of the vehicle 10 with respect to the road surface R (see FIG. 4) based on the measured values thus obtained and controlling brake hydraulic pressures of the respective tires and the like based on a result of the determination. When the VSC 66 is actuated to cause the vehicle 10 to run stably, an actuation signal of the VSC 66 is output to the vehicle state detection unit 62.

(ABS)

The ABS 68 is configured to monitor the rotational speeds of the respective tires of the vehicle 10, and is configured, when at least one of the tires is locked, to reduce a wheel cylinder pressure of the locked tire and thus unlock the tire. When the ABS 68 is actuated to cause the vehicle 10 to run stably, an actuation signal of the ABS 68 is output to the vehicle state detection unit 62.

As described hitherto, the side skid suppression unit 64 suppresses the side skid of the vehicle 10, and outputs an actuation signal to the vehicle state detection unit 62 in suppressing this side skid.

⟨ Vehicle State Detection Unit⟩

The vehicle state detection unit 62 is an example of the state detection unit. Besides, the vehicle state detection unit 62 is configured as a computer having a bus (not shown) to which a CPU (not shown), a ROM (not shown), a RAM (not shown), and an I/O (not shown) are connected. The side skid suppression unit 64 is electrically connected to the vehicle state detection unit 62.

When no actuation signal is input to the vehicle state detection unit 62 from the side skid suppression unit 64, the vehicle state detection unit 62 detects (determines) the running state of the vehicle 10 as the stable state, and outputs detected information on the stable state to the ECU 32. Besides, when an actuation signal is input to the vehicle state detection unit 62 from the side skid suppression unit 64, the vehicle state detection unit 62 detects (determines) the running state of the vehicle 10 as the unstable state, and outputs detected information on the unstable state to the ECU 32. Incidentally, in the present embodiment, for example, actuation signals are output to the vehicle state detection unit 62 from the VSC 66 and the ABS 68 respectively. However, these actuation signals may be summarized into a single actuation signal of the side skid suppression unit 64 and then output to the vehicle state detection unit 62.

It should be noted herein that, for example, when an actuation signal is input to the vehicle state detection unit 62 from at least one of the VSC 66 and the ABS 68, the vehicle state detection unit 62 detects' (determines) the behavior of the vehicle as the unstable state, and outputs detected information on the unstable state to the ECU 32. Besides, when no actuation signal is input to the vehicle state detection unit 62 from the VSC 66 and the ABS 68; the vehicle state detection unit 62 detects (determines) the behavior of the vehicle as the stable state, and outputs detected information on the stable state to the ECU 32.

[Operation and Effect]

Figure 8:
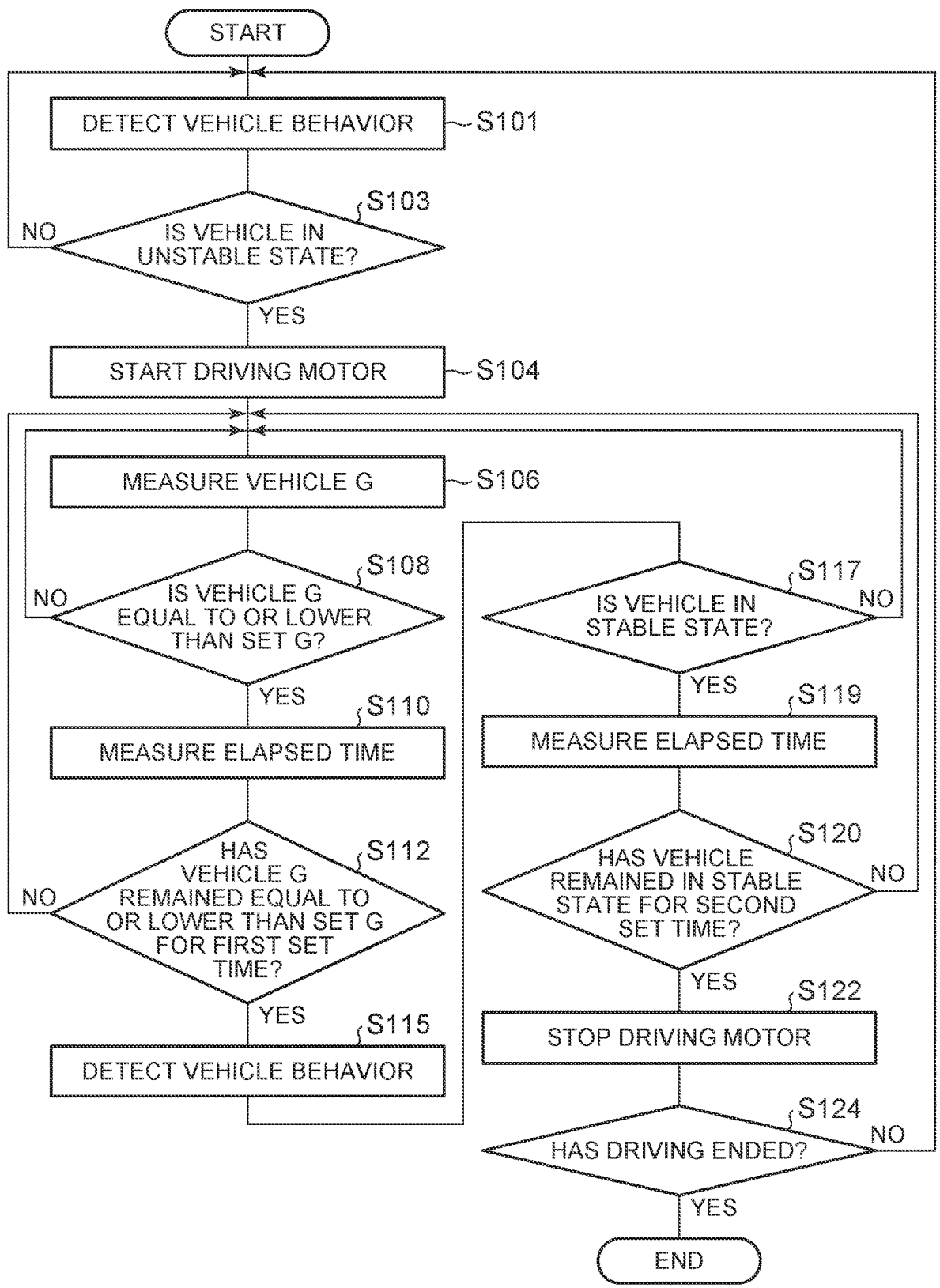
FIG. 8 is a flowchart showing a process of selecting the stoppage or continuation of the driving of a motor of a PSB in the seat belt control device shown in FIG. 7.

Next, the operation and effect of the seat belt control device 60 according to the second embodiment will be described using a flowchart shown in FIG. 8. Incidentally, reference should be made to FIGS. 1 and 7 in terms of the various components and the like of the vehicle 10 including the seat belt control device 60, and individual reference numerals thereof are omitted. Besides, the same steps as in the flowchart shown in FIG. 6 are accompanied by the same step numbers respectively, and the description thereof will be omitted.

In step S101, the vehicle state detection unit 62 detects the behavior of the vehicle as an example of detection of the behavior of the vehicle. In concrete terms, when no actuation signal is input to the vehicle state detection unit 62 from the side skid suppression unit 64, the vehicle state detection unit 62 outputs a signal corresponding to the stable state to the ECU 32. Besides, when an actuation signal is input to the vehicle state detection unit 62 from the side skid suppression unit 64, the vehicle state detection unit 62 outputs a signal corresponding to the unstable state to the ECU 32. Then, a transition to step S103 is made.

In step S103, the ECU 32 determines, based on information on the behavior of the vehicle input from the vehicle, state detection unit 62, whether or not the vehicle is in the unstable state. If the vehicle 10 is in the unstable state, a transition to step S104 is made. If the vehicle 10 is in the stable state, a transition to step S101 is made. In steps S104 to S112, the same processing as in the first embodiment is performed.

In step S115, the vehicle state detection unit 62 detects the behavior of the vehicle according to a method similar to that of step S101. Besides, the vehicle state detection unit 62 outputs a signal corresponding to the stable state or the unstable state to the ECU 32. Then, a transition to step S117 is made.

In step S117, the ECU 32 determines, based on information on the behavior of the vehicle input from the vehicle state detection unit 62, whether or not the vehicle is in the stable state. If the vehicle 10 is in the stable state, a transition to step S119 is made. If the vehicle 10 is in the unstable state, a transition to step S106 is made.

In step S119, the timer 46 measures the elapsed time T2. Information on the measured elapsed time T2 is output to the ECU 32. In concrete terms, the information on the elapsed time T2 from a timing when a signal corresponding to the stable state is output from the vehicle state detection unit 62 to the ECU 32 to a timing of measurement is output to the ECU 32. Then, a transition to step S120 is made. In steps S120 to S124, the same processing as in the first embodiment is performed. When the driving of the vehicle is ended, the program is ended (the present processing routine is ended).

As described above, in the seat belt control device 60, the ECU 32 stops driving the motor 49 when the acceleration measured by the acceleration sensor 36 during the driving of the motor 49 has remained lower than the set acceleration A1 for at least the first set time TA and the vehicle 10 has remained in the stable state detected by the vehicle state detection unit 62 for at least the second set time TB. Therefore, the motor 49 is stopped from being driven with less necessity to restrain the occupant D than in a configuration in which a determination on the stoppage of the driving of the motor 49 is made based only on one of a duration time of the acceleration of the vehicle 10 and a duration time of the stable state of the vehicle 10. Therefore, the occupant D can be restrained from developing a feeling of strangeness. Besides, the motor 49 is stopped from being driven, and the urging unit 29 urges the spool 28. Therefore, the occurrence of a so-called end lock state where the pullout of the webbing 22 is locked can be suppressed.

On the other hand, the ECU 32 continues to drive the motor 49 at least either when the acceleration has remained lower than the set acceleration A1 for a time shorter than the first set time TA or when the vehicle has remained in the stable state detected by the vehicle state detection unit 62 for a time shorter than the second set time TB. Thus, the motor 49 is restrained from being stopped from being driven when the occupant D needs to be restrained. Therefore, the occupant D can be restrained from developing a feeling of strangeness. For example, when the vehicle 10 is in the slalom state and the steering angle is equal to or close to zero, the motor 49 is not stopped from being driven (the motor 49 continues to be driven), and the restraint of the occupant D is not relaxed. Therefore, the occupant D can be restrained from developing a feeling of strangeness.

Besides, in the seat belt control device 60, when a determination on the stoppage of the driving of the motor 49 is made, the presence/absence of an operation of suppressing the side skid of the vehicle 10 as well as the vehicle G of the vehicle 10 is used as a condition for making the determination. That is, it is determined, through the use of more pieces of information on the vehicle 10, whether or not the vehicle 10 is in the stable state. Therefore, the occupant D can be more restrained from developing a feeling of strangeness than in a configuration in which the conditions for making the determination do not include the presence/absence of the operation of suppressing the side skid of the vehicle.

Third Embodiment

Next, a seat belt control device 70 as an exemplary control device for a vehicle seat belt according to a third embodiment will be described. The seat belt control device 70 is provided instead of the seat belt control device 30 (see FIG. 1) in the vehicle 10 (see FIG. 1). Incidentally, the basically same components as those of the seat belt control device 30 are denoted by the same reference symbols respectively, and the description thereof will be omitted. Besides, the components of the vehicle 10 other than the seat belt control device 70 are identical to those of the first embodiment, so the description thereof will be omitted.

Figure 9:
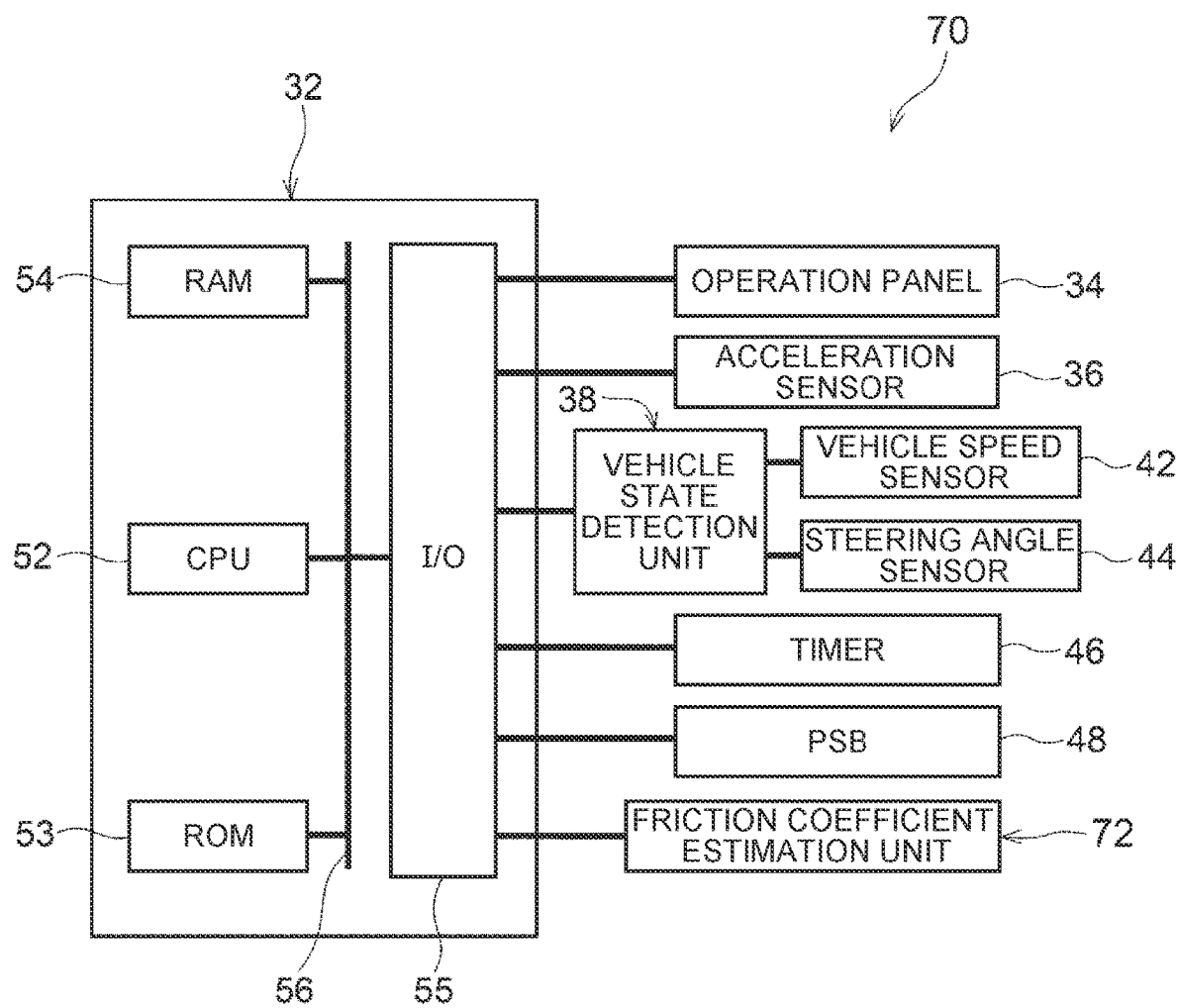
FIG. 9 is a block diagram showing the configuration of a seat belt control device according to a third embodiment.

The seat belt control device 70 shown in FIG. 9 is obtained by adding a friction coefficient estimation unit 72 to the seat belt control device 30 (see FIG. 2). The components other than the friction coefficient estimation unit 72 are identical in configuration to those of the seat belt control device 30.

⟨Friction Coefficient Estimation Unit⟩

The friction coefficient estimation unit 72 estimates a friction coefficient μ of the road surface R (see FIG. 4) on which the vehicle 10 runs. As a method of estimating the friction coefficient μ, it is possible to adopt a known method of estimation according to which, for example, the friction coefficient μ is estimated from a detection result of an external sensor (not shown) that is provided in the vehicle 10 (e.g., a captured image of the road surface R). Incidentally, other methods of estimating the friction coefficient μ include, for example, a method disclosed in Japanese Unexamined Patent Application Publication No. 2010-38194 (JP 2010-38194 A).

⟨Settings in ECU⟩

A program is set in the ECU 32 in such a manner as to reduce the set acceleration A1 when the friction coefficient μ estimated by the friction coefficient estimation unit 72 is lower than a set friction coefficient μa. In concrete terms, in addition to the set acceleration A1, a set acceleration A2 that is lower than the set acceleration A1 is stored in the ECU 32. That is, the program is set in the ECU 32 in such a manner as to change the set acceleration A1 into the set acceleration A2 when the friction coefficient μ estimated by the friction coefficient estimation unit 72 is lower than the set friction coefficient μa. Incidentally, the set acceleration A1 is an example of the first set acceleration. The set acceleration A2 is an example of the second set acceleration. Besides, for example, the ECU 32 changes the set accelerations A1 and A2 prior to the processing steps of the flowchart shown in FIG. 6.

[Operation and Effect]

Figure 10:
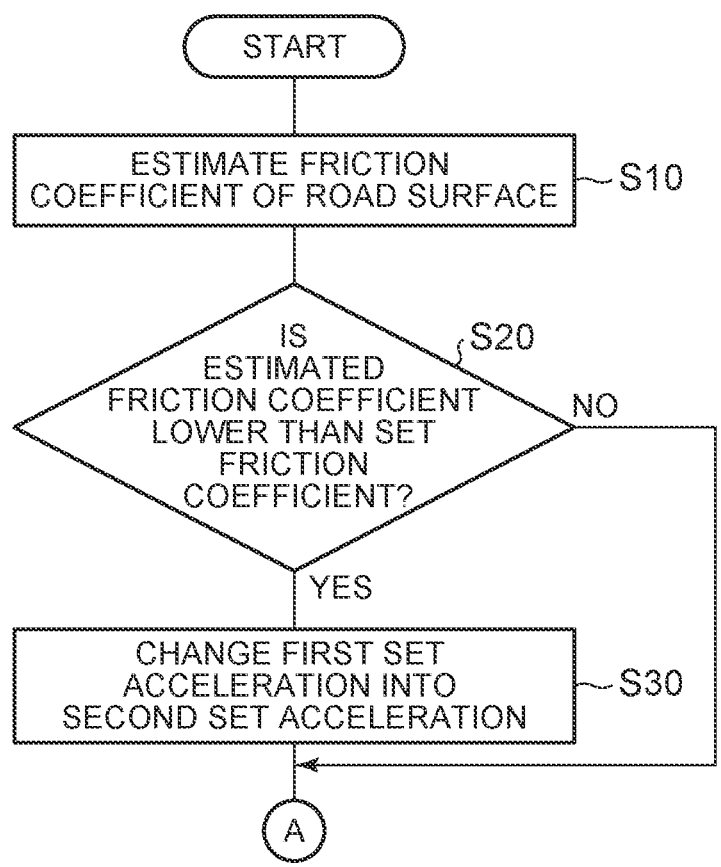
FIG. 10 is part of a flowchart showing a process of comparing an estimated friction coefficient of a road surface and a set friction coefficient with each other in the seat belt control device shown in FIG. 9.
Figure 11:
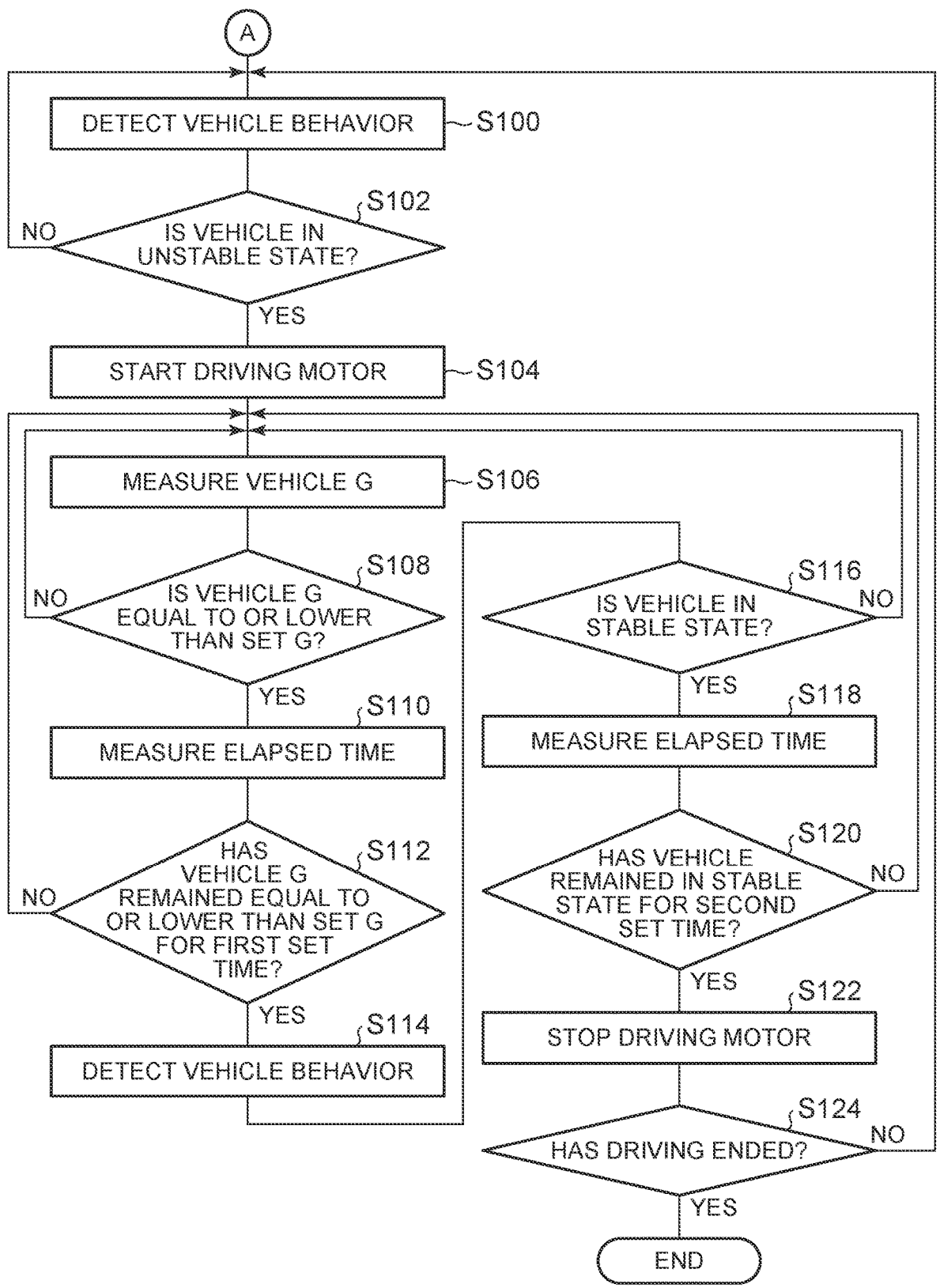
FIG. 11 is part of a flowchart showing a process following the flowchart shown in FIG. 10, a flowchart shown in FIG. 14, or a flowchart shown in FIG. 16.

Next, the operation and effect of the seat belt control device 70 according to the third embodiment will be described using flowcharts shown in FIGS. 10 and 11. Incidentally, reference should be made to FIGS. 1 and 9 in terms of the various components and the like of the vehicle 10 including the seat belt control device 70; and individual reference numerals thereof are omitted. Besides, the same steps as in the flowchart shown in FIG. 6 are accompanied by the same step numbers respectively, and the description thereof will be omitted.

In step S10, the friction coefficient estimation unit 72 estimates the friction coefficient μ of the road surface R (see FIG. 4). Besides, the friction coefficient estimation unit 72 outputs a signal corresponding to the estimated friction coefficient μ to the ECU 32. Then, a transition to step S20 is made. Incidentally, it is assumed that the set acceleration set in the ECU 32 has been initialized to the set acceleration A1 before executing the present processing routine.

In step S20, the ECU 32 determines, based on information on the friction coefficient μ input from the friction coefficient estimation unit 72, whether or not the friction coefficient μ is lower than the set friction coefficient μa. If the friction coefficient μ is lower than the set friction coefficient μa, a transition to step S30 is made. If the friction coefficient μ is equal to or higher than the set friction coefficient pa, a transition to step S100 (see FIG. 11) is made.

In step S30, the ECU 32 changes the set acceleration A1 into the set acceleration A2. Then, a transition to step S100 (see FIG. 11) is made.

In steps S100 to S124, the same processing as in the first embodiment is performed, so the description thereof will be omitted. When the driving of the vehicle is ended, the program is ended (the present processing routine is ended).

When the set acceleration is made equal to the set acceleration A1, the same operation as in the first embodiment is obtained, so the description thereof will be omitted. A case where the set acceleration is made equal to the set acceleration A2 will be described hereinafter.

In the seat belt control device 70, the ECU 32 stops driving the motor 49 when the acceleration measured by the acceleration sensor 36 during the driving of the motor 49 has remained lower than the set acceleration A2 for at least the first set time TA and the vehicle 10 has remained in the stable state detected by the vehicle state detection unit 62 for at least the second set time TB. Therefore, the motor 49 is stopped from being driven with less necessity to restrain the occupant D than in a configuration in which a determination on the stoppage of the driving of the motor 49 is made based only on one of a duration time of the acceleration of the vehicle 10 and a duration time of the stable state of the vehicle 10. Therefore, the occupant D can be restrained from developing a feeling of strangeness. Besides, the motor 49 is stopped from being driven, and the urging unit 29 urges the spool 28. Therefore, the occurrence of a so-called end lock state where the pullout of the webbing 22 is locked can be suppressed.

On the other hand, the ECU 32 continues to drive the motor 49 at least either when the acceleration has remained lower than the set acceleration A2 for a time shorter than the first set time TA or when the vehicle has remained in the stable state detected by the vehicle state detection unit 62 for a time shorter than the second set time TB. Thus, the motor 49 is restrained from being stopped from being driven when the occupant D needs to be restrained. Therefore, the occupant D can be restrained from developing a feeling of strangeness. For example, when the vehicle 10 is in the slalom state and the steering angle is equal to or close to zero, the motor 49 is not stopped from being driven (the motor 49 continues to be driven), and the restraint of the occupant D is not relaxed. Therefore, the occupant D can be restrained from developing a feeling of strangeness.

Besides, in the seat belt control device 70, when a determination on the stoppage of the driving of the motor 49 is made, the speed V of the vehicle 10 and the steering angle θ of the vehicle 10 as well as the acceleration of the vehicle 10 are used as conditions for making the determination. That is, it is determined, through the use of more pieces of information on the vehicle 10, whether or not the vehicle 10 is in the stable state. Therefore, the occupant D can be more restrained from developing a feeling of strangeness than in a configuration in which the conditions for making the determination do not include the speed V of the vehicle 10 and the steering angle θ of the vehicle 10.

In the case where the friction coefficient of the road surface R is relatively low, the vehicle 10 may skid at the same speed and in the same direction before the vehicle 10 stops or assumes the stable state. Then, when the vehicle 10 skids at the same speed and in the same direction, it may be determined that the vehicle 10 is in the stable state.

It should be noted herein that the friction coefficient estimation unit 72 estimates the friction coefficient of the road surface R in the seat belt control device 70. Then, when the friction coefficient μ estimated by the friction coefficient estimation unit 72 is lower than the set friction coefficient μa, the ECU 32 changes (reduces) the set acceleration A1 into the set acceleration A2. Therefore, the motor 49 is not stopped from being driven unless the vehicle 10 assumes the stable state where the acceleration thereof (the vehicle G) is lower than before the set acceleration is reduced. Therefore, the restraint of the occupant D can be restrained from being relaxed in a state where the vehicle 10 is likely to skid sideways.

Figure 12:
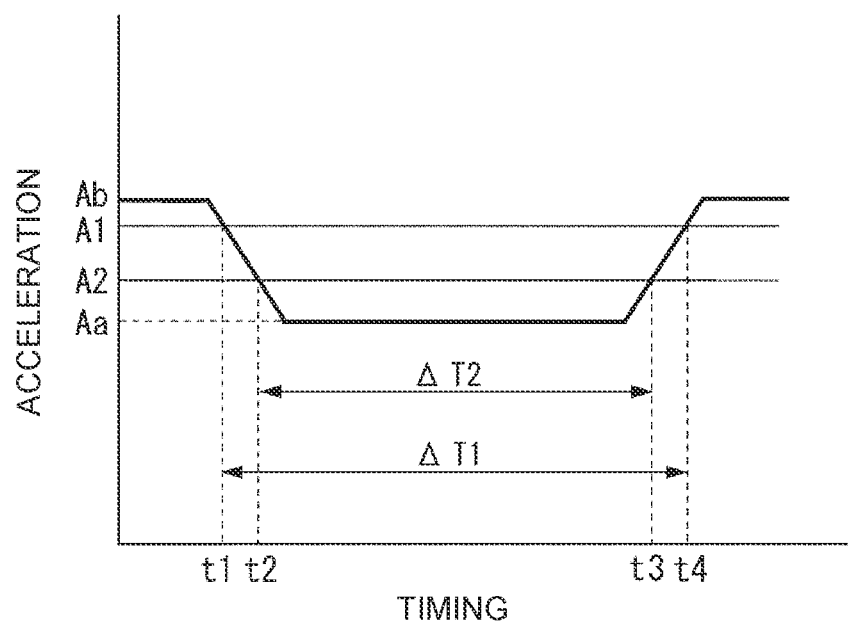
FIG. 12 is a graph of a vehicle acceleration indicating that an elapsed time used for determination changes when a set acceleration is changed in the seat belt control device shown in FIG. 9.

FIG. 12 is a graph showing the acceleration of the vehicle 10 (see FIG. 1) at respective timings. The acceleration Aa is a minimum value among the measured accelerations. An acceleration Ab is a maximum value among the measured accelerations. It is assumed herein that there is a relationship: t1<t2<t3<t4 among these timings, and in the case of the set acceleration A1, a time ΔT1 from the timing t1 to the timing t4 is a time (a section) when the acceleration of the vehicle 10 is lower than the set acceleration A1. On the other hand, in the case of the set acceleration A2, a time ΔT2 from the timing t2 to the timing t3 is a time (a section) when the acceleration of the vehicle 10 is lower than the set acceleration A2. Incidentally, the timings t1, t2, t3, and t4 shown in FIG. 12 are different from the timings t1, t2, t3, and t4 shown in FIG. 3 respectively.

In the case where the set acceleration is thus reduced from the set acceleration A1 to the set acceleration A2, the section (the time) when the acceleration of the vehicle 10 is lower than the set acceleration shortens. Therefore, in order for the time when the acceleration of the vehicle 10 is lower than the set acceleration to be determined as a time longer than the set time, the vehicle 10 needs to be in a more stable state. In other words, even in the case where the set acceleration is changed from the set acceleration A1 to the set acceleration A2, when the acceleration of the vehicle 10 remains lower than the set acceleration A2 for a long time, the vehicle 10 is in a more stable state. It is therefore safe to conclude that the occupant D is unlikely to develop a feeling of strangeness even when the motor 49 is stopped.

Fourth Embodiment

Next, a seat belt control device 80 as an exemplary control device for a vehicle seat belt according to a fourth embodiment will be described. The seat belt control device 80 is provided instead of the seat belt control device 30 (see FIG. 1) in the vehicle 10 (see FIG. 1). Incidentally, the basically same components as those of the seat belt control devices 30, 60, and 70 are denoted by the same reference symbols respectively, and the description thereof will be omitted. Besides, the components of the vehicle 10 other than the seat belt control device 80 are identical to those of the first embodiment, so the description thereof will be omitted.

Figure 13:
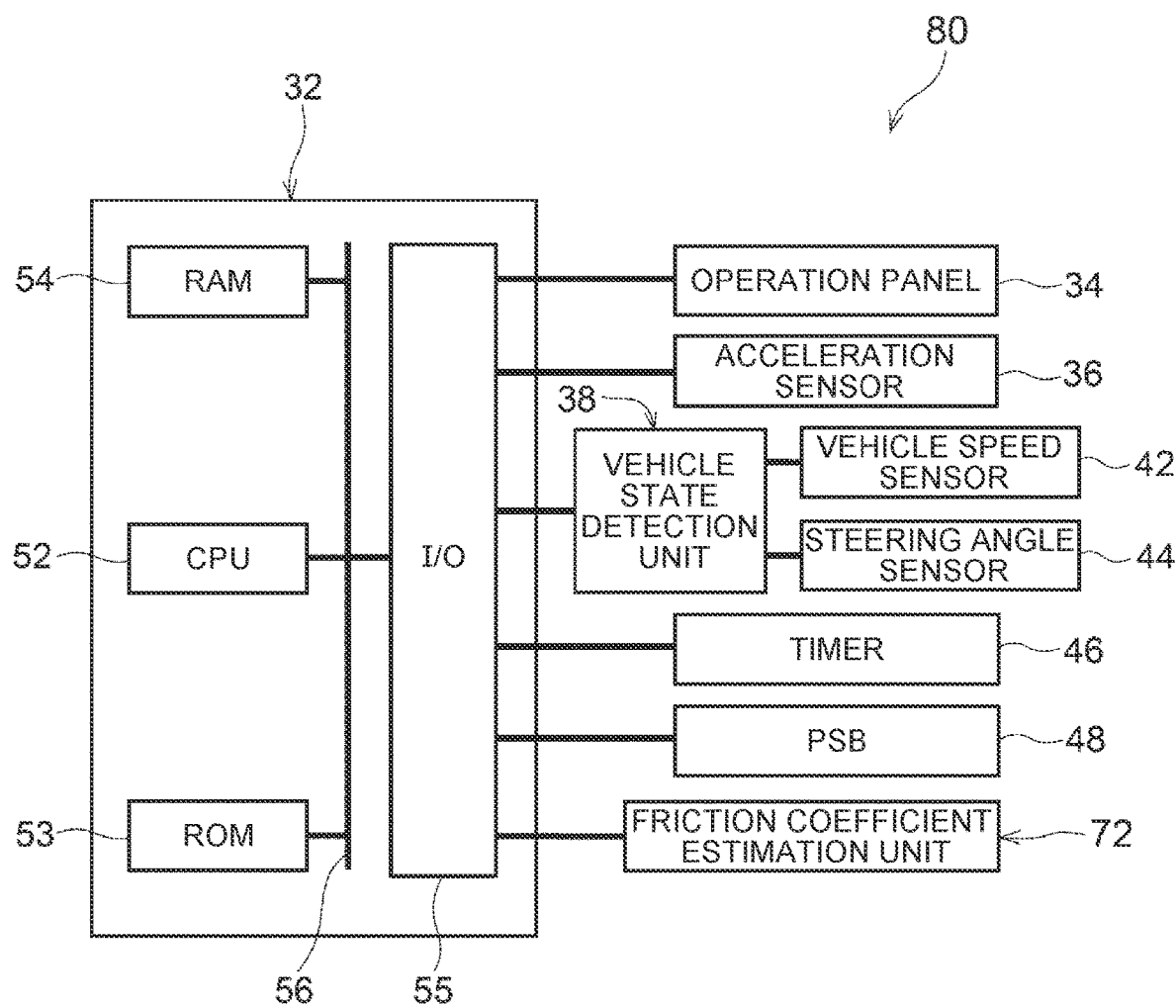
FIG. 13 is a block diagram showing the configuration of a seat belt control device according to a fourth embodiment.

The seat belt control device 80 shown in FIG. 13 is obtained by adding the friction coefficient estimation unit 72 to the seat belt control device 30 (see FIG. 2). The components other than the friction coefficient estimation unit 72 are identical in configuration to those of the seat belt control device 30.

⟨Settings in ECU⟩

For example, a program is set in the ECU 32 in such a manner as to lengthen the first set time TA and the second set time. TB when the friction coefficient μ estimated by the friction coefficient estimation unit 72 is lower than the set friction coefficient μa. In concrete terms, a third set time TC and a fourth set time TD as well as the first set time TA and the second set time TB are stored in the ECU 32. The third set time TC is longer than the first set time TA. The fourth set time TD is longer than the second set time TB.

That is, the program is set in the ECU 32 in such a manner as to change the first set time TA into the third set time TC and change the second set time TB into the fourth set time TD when the friction coefficient μ estimated by the friction coefficient estimation unit 72 is lower than the set friction coefficient μa. Besides, for example, the ECU 32 changes the first set time TA and the second set time TB prior to the processing steps of the flowchart shown in FIG. 6.

[Operation and Effect]

Figure 14:
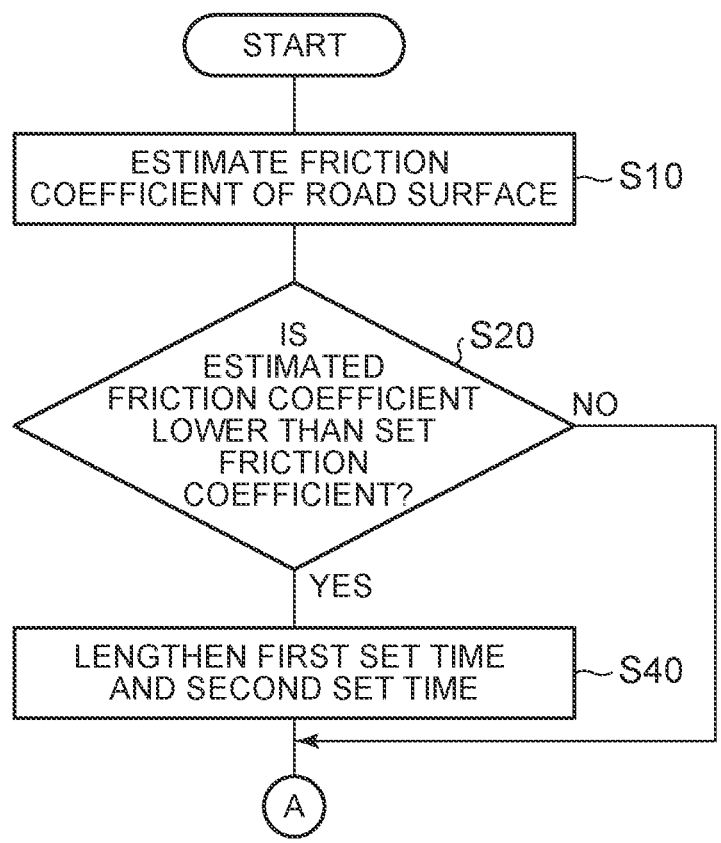
FIG. 14 is part of a flowchart showing a process of comparing an estimated friction coefficient of a road surface and a set friction coefficient with each other in the seat belt control device shown in FIG. 13.

Next, the operation and effect of the seat belt control device 80 according to the fourth embodiment will be described using a flowchart shown in FIG. 14 and the flowchart shown in FIG. 11. Incidentally, reference should be made to FIGS. 1 and 13 in terms of the various components and the like of the vehicle 10 including the seat belt control device 80, and individual reference numerals thereof are omitted. Besides, the same steps as in the flowchart shown in FIG. 6 are accompanied by the same step numbers respectively, and the description thereof will be omitted. Furthermore, it is assumed that the lengths of set time set in the ECU 32 have been initialized to the first set time TA and the second set time TB respectively before executing the present processing routine.

If the friction coefficient μ is lower than the set friction coefficient μa after carrying out step S10 and step S20, a transition to step S40 is made. If the friction coefficient μ is equal to or higher than the set friction coefficient μa, a transition to step S100 (see FIG. 11) is made.

In step S40, the ECU 32 changes the first set lime TA into the third set time TC, and changes the second set time TB into the fourth set time TD. Then, a transition to step S100 (see. FIG. 11) is made. In steps S100 to S124, the same processing as in the first embodiment is performed, so the description thereof will be omitted. When the driving of the vehicle is ended, the program is ended (the present processing routine is ended). Incidentally, when the lengths of set time are made equal to the set time TA and the set time TB respectively, the same operation as in the first embodiment is obtained, so the description thereof will be omitted. A case where the lengths of set time are made equal to the third set time TC and the fourth set time TD respectively will be described herein.

In the seat belt control device 80, the ECU 32 stops driving the motor 49 when the acceleration measured by the acceleration sensor 36 during the driving of the motor 49 has remained lower than the set acceleration A1 for at least the third set time TC and the vehicle 10 has remained in the stable state detected by the vehicle state detection unit 62 for at least the fourth set time TD. Therefore, the motor 49 is stopped from being driven with less necessity to restrain the occupant D than in a configuration in which a determination on the stoppage of the driving of the motor 49 is made based only on one of a duration time of the acceleration of the vehicle 10 and a duration time of the stable state of the vehicle 10. Therefore, the occupant D can be restrained from developing a feeling of strangeness. Besides, the motor 49 is stopped from being driven, and the urging unit 29 urges the spool 28. Therefore, the occurrence of a so-called end lock state where the pullout of the webbing 22 is locked can be suppressed.

On the other hand, the ECU 32 continues to drive the motor 49 at least either when the acceleration has remained lower than the set acceleration A1 for a time shorter than the third set time TC or when the vehicle has remained in the stable state detected by the vehicle state detection unit 62 for a time shorter than the fourth set time TD. Thus, the motor 49 is restrained from being stopped from being driven when the occupant D needs to be restrained. Therefore, the occupant D can be restrained from developing a feeling of strangeness. For example, when the vehicle 10 is in the slalom state and the steering angle is equal to or close to zero, the motor 49 is not stopped from being driven, and the restraint of the occupant D is not relaxed. Therefore, the occupant D can be restrained from developing a feeling of strangeness.

Besides, in the seat belt control device 80, when a determination on the stoppage of the driving of the motor 49 is made, the speed V of the vehicle 10 and the steering angle θ of the vehicle 10 as well as the acceleration of the vehicle 10 are used as conditions for making the determination. That is, it is determined, through the use of more pieces of information on the vehicle 10, whether or not the vehicle 10 is in the stable state. Therefore, the occupant D can be more restrained from developing a feeling of strangeness than in a configuration in which the conditions for making the determination do not include the speed V of the vehicle 10 and the steering angle θ of the vehicle 10.

Furthermore, in the seat belt control device 80, the friction coefficient estimation unit 72 estimates the friction coefficient μ of the road surface R. Then, when the friction coefficient μ estimated by the friction coefficient estimation unit 72 is lower than the set friction coefficient μa, the ECU 32 lengthens the first set time TA to the third set time TC, and lengthens the second set time TB to the fourth set time TD. The lengthening of the respective lengths of set time means that no determination is made unless the acceleration of the vehicle 10 remains low for a long time and the vehicle 10 remains in the stable state for a long time, respectively.

That is, the motor 49 is not stopped from being driven unless the acceleration of the vehicle 10 becomes lower and the vehicle 10 assumes a more stable state than before at least one of the first set time TA and the second set time TB is lengthened. Thus, the restraint of the occupant D can be restrained from being relaxed in a state where the vehicle 10 is likely to skid sideways.

Fifth Embodiment

Next, a seat belt control device 90 as an exemplary control device for a vehicle seat belt according to a fifth embodiment will be described. The seat belt control device 90 is provided instead of the seat belt control device 70 (see FIG. 9) in the vehicle 10 (see FIG. 1). Incidentally, the basically same components as those of the seat belt control devices 30, 60, and 70 are denoted by the same reference symbols respectively, and the description thereof will be omitted. Besides, the components of the vehicle 10 other than the seat belt control device 90 are identical in configuration to those of the third embodiment, so the description thereof will be omitted.

Figure 15:
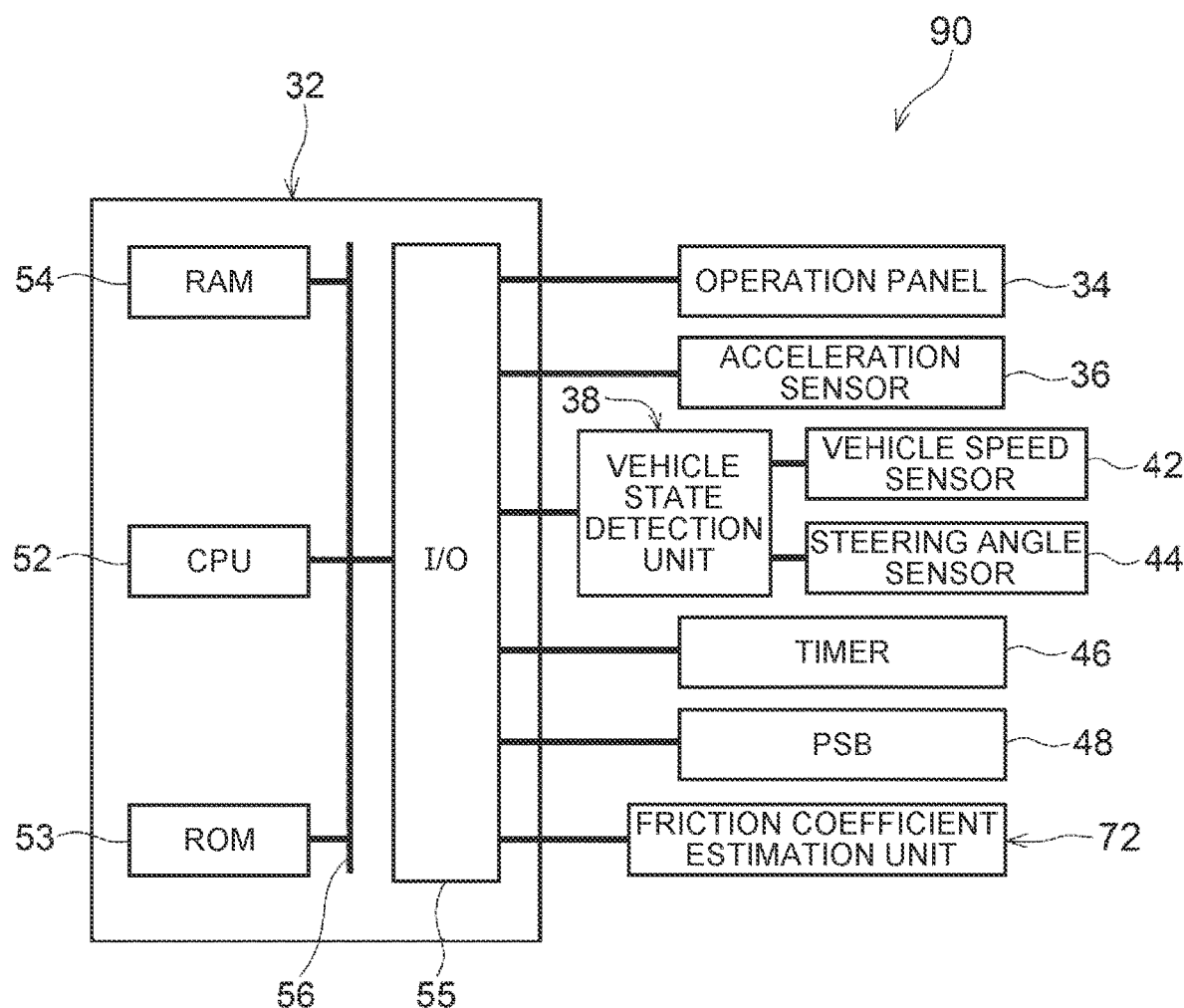
FIG. 15 is a block diagram showing the configuration of a seat belt control device according to a fifth embodiment.

The seat belt control device 90 shown in FIG. 15 is identical in block diagram configuration to the seat belt control device 70 (see FIG. 9). However, the seat belt control device 90 is partially different in the settings in the ECU 32 from the seat belt control device 70.

〈Settings in ECU〉

For example, a program is set in the ECU 32 in such a manner as to reduce the set acceleration and lengthen the first set time TA and the second set time TB when the friction coefficient μ estimated by the friction coefficient estimation unit 72 is lower than the set friction coefficient pa. In concrete terms, the program is set in the ECU 32 in such a manner as to change the set acceleration A1 into the set acceleration A2, change the first set lime TA into the third set time TC, and change the second set time TB into the fourth, set time TD when the friction coefficient μ is lower than the set friction coefficient μa. Incidentally, for example, the ECU 32 changes the set acceleration, the first set time TA, and the second set time TB prior to the respective steps of the flowchart shown in FIG. 6.

[Operation and Effect]

Figure 16:
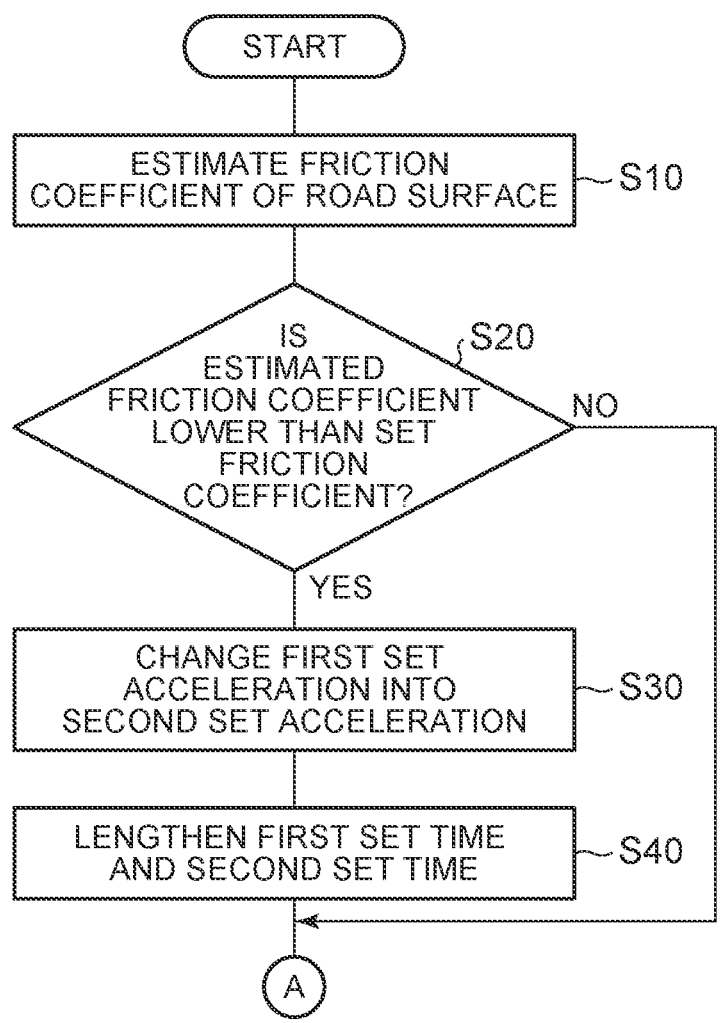
FIG. 16 is part of a flowchart showing a process of comparing an estimated friction coefficient of a road surface and a set friction coefficient with each other in the seat belt control device shown in FIG. 15.

Next, the operation and effect of the seat belt control device 90 according to the fifth embodiment will be described using a flowchart shown in FIG. 16 and the flowchart shown in FIG. 11. Incidentally, reference should be made to FIGS. 1 and 15 in terms of the various components and the like of the vehicle 10 including, the seat belt control device 90, and individual reference numerals thereof are omitted. Besides, the same steps as in the flowchart shown in FIG. 6 are accompanied by the same step numbers respectively, and the description thereof will be omitted. Furthermore, it is assumed that the set acceleration set in the ECU 32 has been initialized to the set acceleration A1 and the lengths of set time set in the ECU 32 have been initialized to the first set time TA and the second set time TB respectively before executing the present processing routine. In addition, the description of the details of the operation that are similar to those of the first to fourth embodiments will be omitted.

If the friction coefficient μ is lower than the set friction coefficient μa after carrying out step S10 and step S20, a transition to step S30 is made. If the friction coefficient μ is equal to or higher than the set friction coefficient μa, a transition to step S100 (see FIG. 11) is made.

In step S30, the ECU 32 changes the set acceleration A1 into the set acceleration A2. Then, a transition to step S40 is made. In step S40, the ECU 32 changes the first set time TA into the third set time TC, and changes the second set time TB into the fourth set time TD. Then, a transition to step S100 (see FIG. 11) is made. In steps S100 to S124, the same processing as in the first embodiment is performed, so the description thereof will be omitted. When the driving of the vehicle is ended, the program is ended (the present processing routine is ended).

In the seat belt control device 90, the friction coefficient estimation unit 72 estimates the friction coefficient of the road surface R. Then, when the friction coefficient μ estimated by the friction coefficient estimation unit 72 is lower than the set friction coefficient μa, the ECU 32 not only changes the set acceleration A1 into the set acceleration A2, but also changes the first set time TA into the third set time TC, and changes the second set time TB into the fourth set time TD. Therefore; the motor 49 is not stopped from being driven unless the vehicle 10 assumes a more stable state than before the set acceleration and the set lengths of time are changed. Thus, the restraint of the occupant D can be further restrained from being relaxed in a state where the vehicle 10 is likely to skid sideways.

Modification Examples

The scope of the claims is not limited to the above-mentioned embodiments. Incidentally, in modification examples that will be described later, the same components as those of the seat belt control devices 30, 60, 70, 80, and 90 are denoted by the same reference symbols respectively, and the description thereof will be omitted.

Figure 17:
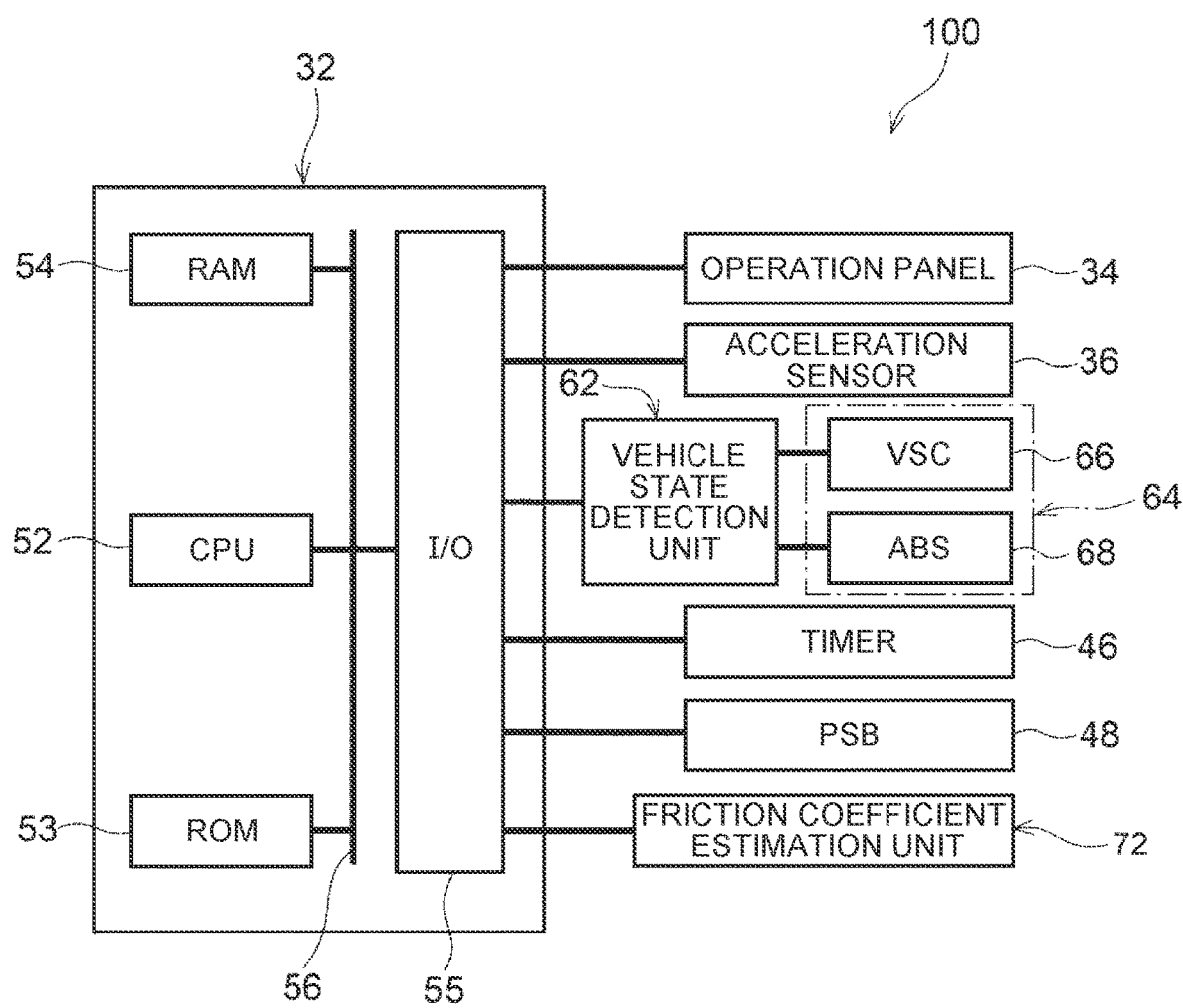
FIG. 17 is a block diagram showing the configuration of a seat belt control device according to a modification example.

As one of the modification examples of the embodiments, a seat belt control device 100 shown in FIG. 17 may be used. The seat belt control device 100 is configured by providing the seat belt control device 90 (see FIG. 15) with the vehicle state detection unit 62 and the side skid suppression unit 64 instead of the vehicle state detection unit 38, the vehicle speed sensor 42, and the steering angle sensor 44. An operation similar to that of the seat belt control device 90 can be obtained even when detection of the state of the vehicle is thus shifted from detection through the use of the estimated acceleration Ac to detection based on whether or not the side skid suppression unit 64 has been actuated.

Incidentally, in the vehicle 10, the vehicle speed sensor 42, the steering angle sensor 44, and the side skid suppression unit 64 may be electrically connected to a single vehicle state detection unit (not shown), and it may be selected, through the use of the operation panel 34, which one of these should be used.

The method of detecting the behavior (the stable state or the unstable state) of the vehicle 10 is not limited to the method using the estimated acceleration Ac or the method based on whether or not the side skid suppression unit 64 has been actuated. For example, an image in front of the vehicle 10 may be acquired, an arrangement and an angle of the vehicle 10 with respect to a lane may be analyzed, and it may be detected whether the vehicle 10 is in the stable state or the unstable state.

In the seat belt control device 80, the first set time TA may be lengthened to the third set time TC, and the second set time TB may not be changed. Besides, in the seat belt control device 80, the second set time TB may be lengthened to the fourth set time TD, and the first set time TA may not be changed. Furthermore, the seat belt control device 80 may be configured to be provided with the vehicle state detection unit 62 and the side skid suppression unit 64 instead of the vehicle state detection unit 38, the vehicle speed sensor 42, and the steering angle sensor 44.

In each of the seat belt control devices 90 and 100, when the friction coefficient μ of the road surface R is lower than the set friction coefficient μa, the first set time TA may be lengthened to the third set time TC, and the second set time TB may not be changed. Besides, in each of the seat belt control devices 90 and 100, when the friction coefficient μ of the road surface R is lower than the set friction coefficient μa, the second set time TB may be lengthened to the fourth set time TD, and the first set time TA may not be changed. In the seat belt control device 90, when the friction coefficient μ of the road surface R is lower than the set friction coefficient μa, the set acceleration Ak for estimation may be reduced.

A trigger used to make a determination on the start of the driving of the motor 49 (detect the behavior of the vehicle) may not necessarily be a detection signal from the vehicle state detection unit 38 or 62, but may be a detection signal from another sensor regarding the behavior of the vehicle.

The ECU 32 may not necessarily be configured as a single ECU, but may be configured as an aggregate of a plurality of ECUs that are provided in accordance with various kinds of control respectively.

The scope of claims should not be limited to the above-mentioned embodiments and modification examples, but can be carried out, as a matter of course, as various modifications or in various combinations within such a range as not to depart from the gist thereof.

What is claimed is:
1. A control device for a vehicle seat belt, comprising:
a retraction unit that is configured to retract a seat belt through use of a driving force of a motor and to stop retracting the seat belt when the motor is stopped from being driven;

an acceleration measurement unit that is configured to measure an acceleration of a vehicle;

a state detection unit that is configured to detect whether or not the vehicle is in a stable state while running;

a vehicle speed sensor that is configured to measure a speed of the vehicle;

a steering angle sensor that is configured to measure a steering angle of the vehicle; and a control unit that is configured
- to stop driving the motor when the acceleration measured by the acceleration measurement unit during driving of the motor has remained lower than a first set acceleration for at least a first set time and the vehicle has remained in the stable state detected by the state detection unit for at least a second set time, and
- to continue to drive the motor at least either when the acceleration has remained lower than the first set acceleration for a time shorter than the first set time, or when the vehicle has remained in the stable state detected by the state detection unit for a time shorter than the second set time, wherein the state detection unit is configured to detect a running state of the vehicle as the stable state when an estimated acceleration obtained based on the speed and the steering angle is equal to or lower than a second set acceleration, and to detect the running state of the vehicle as an unstable state when the estimated acceleration is higher than the second set acceleration.

2. The control device for the vehicle seat belt according to claim 1, further comprising:

a friction coefficient estimation unit that is configured to estimate a friction coefficient of a road surface on which the vehicle runs, wherein the control unit is configured to reduce the first set acceleration when the friction coefficient estimated by the friction coefficient estimation unit is lower than a set friction coefficient.

3. The control device for the vehicle seat belt according to claim 2, wherein the control unit is configured to lengthen at least one of the first set time and the second set time when the friction coefficient estimated by the friction coefficient estimation unit is lower than the set friction coefficient.

4. The control device for the vehicle seat belt according to claim 1, further comprising:

a friction coefficient estimation unit that is configured to estimate a friction coefficient of a road surface on which the vehicle runs, wherein the control unit is configured to lengthen at least one of the first set time and the second set time when the friction coefficient estimated by the friction coefficient estimation unit is lower than a set friction coefficient.

5. The control device for the vehicle seat belt according to claim 1, wherein the control unit is configured to start driving the motor when the state detection unit determines that the vehicle is in the unstable state.

* * * * *